United States Patent [19]

Tanaka et al.

[11] Patent Number: 5,754,712
[45] Date of Patent: May 19, 1998

[54] IMAGE PROCESSING APPARATUS

[75] Inventors: Yuzuru Tanaka, Sapporo; Kinya Takahashi, Yokohama, both of Japan

[73] Assignee: Canon Kabushiki Kaisha, Tokyo, Japan

[21] Appl. No.: 296,937

[22] Filed: Aug. 29, 1994

Related U.S. Application Data

[63] Continuation of Ser. No. 127,112, Sep. 27, 1993, abandoned, which is a continuation of Ser. No. 769,496, Oct. 1, 1991, abandoned, which is a continuation of Ser. No. 681,449, Apr. 4, 1991, abandoned, which is a continuation of Ser. No. 443,179, Nov. 30, 1989, abandoned, which is a division of Ser. No. 165,498, Mar. 8, 1988, Pat. No. 4,907,283.

[30] Foreign Application Priority Data

Mar. 13, 1987 [JP] Japan ................................. 62-058313
Mar. 13, 1987 [JP] Japan ................................. 62-058314

[51] Int. Cl.$^6$ ................................................. G06K 9/36
[52] U.S. Cl. ................... 382/306; 382/112; 382/309; 345/163
[58] Field of Search .................... 382/61, 56, 57, 382/1, 40, 100, 112, 305, 309, 306; 395/148, 149, 145, 156, 166, 54; 345/146, 162, 163, 173

[56] References Cited

U.S. PATENT DOCUMENTS

| | | | |
|---|---|---|---|
| 3,763,467 | 10/1973 | Cash et al. | 340/146.3 WD |
| 3,873,974 | 3/1975 | Bouton et al. | 340/146.3 AC |
| 4,021,777 | 5/1977 | Shepard | 340/146.3 AH |
| 4,048,616 | 9/1977 | Hart et al. | 340/146.3 ED |
| 4,199,748 | 4/1980 | Bacus | 340/146.3 CA |
| 4,408,181 | 10/1983 | Nakayama | 382/61 |
| 4,574,395 | 3/1986 | Kato | 382/61 |
| 4,596,038 | 6/1986 | Yoshida | 382/11 |
| 4,604,653 | 8/1986 | Shimizu | 395/145 |
| 4,653,021 | 3/1987 | Takagi | 364/900 |
| 4,716,542 | 12/1987 | Peltz et al. | 345/73 |
| 4,725,694 | 2/1988 | Auer et al. | 345/173 |
| 4,740,912 | 4/1988 | Whitaker | 395/156 |
| 4,748,678 | 5/1988 | Takeda et al. | 382/56 |
| 4,758,980 | 7/1988 | Tsunekawa et al. | 382/61 |
| 4,760,606 | 7/1988 | Lesnick et al. | 382/48 |
| 4,899,377 | 2/1990 | Bauer et al. | 345/173 |
| 5,038,392 | 8/1991 | Morris et al. | 382/61 |
| 5,129,016 | 7/1992 | Murakami et al. | 382/61 |

*Primary Examiner*—Leo Boudreau
*Assistant Examiner*—Christopher S. Kelley
*Attorney, Agent, or Firm*—Fitzpatrick, Cella, Harper & Scinto

[57] ABSTRACT

An image processing apparatus includes an image input unit for inputting image information, a trimming unit for trimming an area for classifying and summarizing the image information input by the image input unit, a recognition unit for recognizing information representing each image information in the area trimmed by the trimming unit, and a search unit for searching image information by at least one of pieces of the information recognized by the recognition unit.

46 Claims, 23 Drawing Sheets

| CHARACTER | DEGENERATE CODE |
|---|---|
| a c e m n o r s u v w x z | 0 0 |
| b d f h i k l t | 0 1 |
| g p q y | 1 0 |
| j | 1 1 |

FIG. 7

FIG. 8B
|  |  | UDflag VUPflag | UDflag VUPflag |
|---|---|---|---|
| CRflag | 0 | 0  0 | 0  1 |
|  | 1 | 1  0 | 1  1 |
FIG. 9
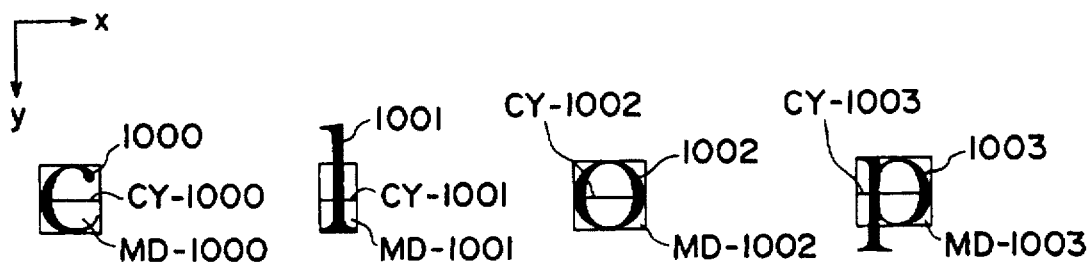
FIG. 10

| CHARACTER | DEGENERATE CODE |
|---|---|
| c e r s x z | 0 0 |
| f i j l t | 0 1 |
| a m n o u v w | 1 0 |
| b d g h k p q y | 1 1 |

FIG. 11

| CRflag | UDflag | UPflag | DEGENERATE CODE |
|---|---|---|---|
| 0 | 0 | 0 | 0 0 0 |
| 0 | 0 | 1 | 0 0 1 |
| 0 | 1 | 0 | 0 1 0 |
| 0 | 1 | 1 | 0 1 1 |
| 1 | 0 | 1 | 1 0 0 |
| 1 | 0 | 1 | 1 0 1 |
| 1 | 1 | 0 | 1 1 0 |
| 1 | 1 | 1 | 1 1 1 |

FIG. 12

| CHARACTER | DEGENERATE CODE |
|---|---|
| c e r s x z | 0 0 0 |
| f i l t | 0 0 1 |
|  | 0 1 0 |
| j | 0 1 1 |
| a m n o u v w | 1 0 0 |
| b d h k | 1 0 1 |
| g p q y | 1 1 0 |
|  | 1 1 1 |

FIG. 13

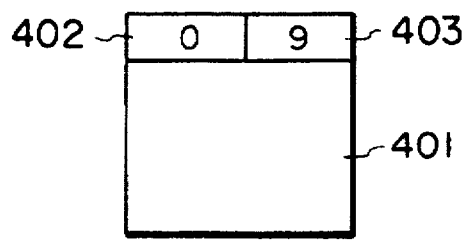
FIG. 19
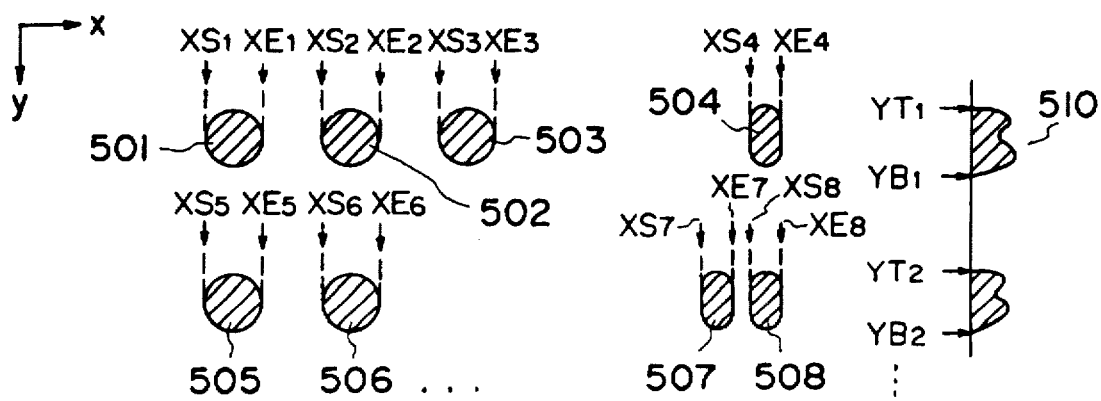
FIG. 20
| 601 | 1 | YS1 | YE1 | XS1 | XE1 | 5114 |
|---|---|---|---|---|---|---|
| | 2 | YS2 | YE2 | XS2 | XE2 | |
| | ⋮ | ⋮ | ⋮ | ⋮ | ⋮ | |
| | 5 | YS5 | YE5 | XS5 | XE5 | |
| | ⋮ | ⋮ | ⋮ | ⋮ | ⋮ | |
| | 9 | END | END | END | END | |
| | ⋮ | ⋮ | ⋮ | ⋮ | ⋮ | |
FIG. 21

| | 1402 | 1403 | 1404 | 1405 | 1406 | 1407 | 1401 |
|---|---|---|---|---|---|---|---|
| | 1 | XRS1 | XRE1 | YRS1 | YRE1 | P1 | |
| | 2 | XRS2 | XRE2 | YRS2 | YRE2 | P2 | |
| | 3 | XRS3 | XRE3 | YRS3 | YRE3 | P3 | |
| | 4 | ⋮ | ⋮ | ⋮ | ⋮ | ⋮ | |

IMAGE PROCESSING APPARATUS

This application is a continuation of application Ser. No. 08/127,112 filed Sep. 27, 1993, now abandoned, which is a continuation of application Ser. No. 07/769,496 filed Oct. 1, 1991, now abandoned, which is a continuation of application Ser. No. 07/681,449 filed Apr. 4, 1991, now abandoned, which is a continuation of application Ser. No. 07/443,179 filed Nov. 30, 1989, now abandoned, which is a division of application Ser. No. 07/165,498 filed on Mar. 8, 1988, now U.S. Pat. No. 4,907,283.

BACKGROUND OF THE INVENTION

1. Field of the Invention

The present invention relates to a character train search apparatus for searching any character string of a sentence input as an image.

2. Related Background Art

In a conventional image editing apparatus, a character area is trimmed from sentences input as raster images, part of the character area is deleted, a new character pattern is inserted in or added to the sentences, or a given character pattern is moved from one position to another.

In the image editing apparatus described above, since standard character codes (JIS and ASCII codes) are not obtained by character recognition, no means for searching any desired character train from the input character image is available. Therefore, the sentence image is displayed on a display and a desired character string must be searched one by one while an operator observes the screen.

Each character of the input sentence image may be converted into a corresponding standard character code by a conventional character recognition apparatus. However, when a large number of sentence image patterns are to be searched the recognition processing is inevitably performed on characters excluded from the characters of interest, thus wasting the time and degrading efficiency.

An electronic filing apparatus is available as a conventional apparatus for storing and preserving a document as an image.

The above conventional apparatuses, however, cannot immediately access or display the page to be referenced by the user. The user must check the contents from the first page to the end page to search a page of interest. When one document consists of many pages, search access is time-consuming.

SUMMARY OF THE INVENTION

It is an object of the present invention to eliminate the conventional drawbacks described in consideration of the above situation.

It is another object of the present invention to provide an image processing apparatus wherein complicated processing for recognizing each character pattern extracted or trimmed from a sentence image as in a conventional character recognition apparatus need not be performed, a code (to be referred to as a degenerate code hereinafter) having a few bits and different from a standard character code is assigned in preprocessing of image editing by simple image processing, extracted character data is stored, a means for determining a coincidence/noncoincidence of the degenerate code train is arranged to search an arbitrary character train of a sentence image.

It is still another object of the present invention to extract and store items for classifying document contents of a document image, a means for matching the extracted item with a main body describing the detailed content corresponding to the item is arranged, only the items are displayed on the screen, a desired item is selected by coordinate values on the screen, and the corresponding main body is searched and displayed on the screen.

It is still another object of the present invention to provide an image processing apparatus wherein each item area and the corresponding main body page describing the content of the item area are recognized from a page image of the table of contents or index in a document, and the recognized data are stored in a table, an image of the table of contents or index page is displayed on a display, and upon designation of a desired item with a coordinate pointer on the screen, the corresponding main body is displayed.

It is still another object of the present invention to provide an image processing apparatus comprising a means for extracting a headline of image information of a newspaper, wherein only an image of the headline is displayed on a display, and upon designation of a desired headline image with a coordinate pointer, the corresponding main body is displayed on the screen.

BRIEF DESCRIPTION OF THE DRAWINGS

FIG. 7 is a table showing one-to-one correspondence between the characters and degenerate codes;

FIGS. 8A and 8B are a flow chart for explaining degenerate code generation processing and maps of main registers according to a second embodiment of the present invention;

FIG. 9 is a table showing a degenerate code according to the second embodiment;

FIG. 10 is a view for explaining a method of generating a degenerate code according to the second embodiment;

FIG. 11 is a table showing one-to-one correspondence between the characters and degenerate codes according to the second embodiment;

FIG. 12 is a table showing degenerate codes according to a third embodiment of the present invention;

FIG. 13 is a table showing one-to-one correspondence between the characters and the degenerate codes according to the third embodiment;

FIG. 19 is a view showing a document file format;

FIG. 20 is a view for explaining character trimming;

FIG. 21 is a table showing a position information buffer;

DETAILED DESCRIPTION OF THE PREFERRED EMBODIMENTS

Figure 1:
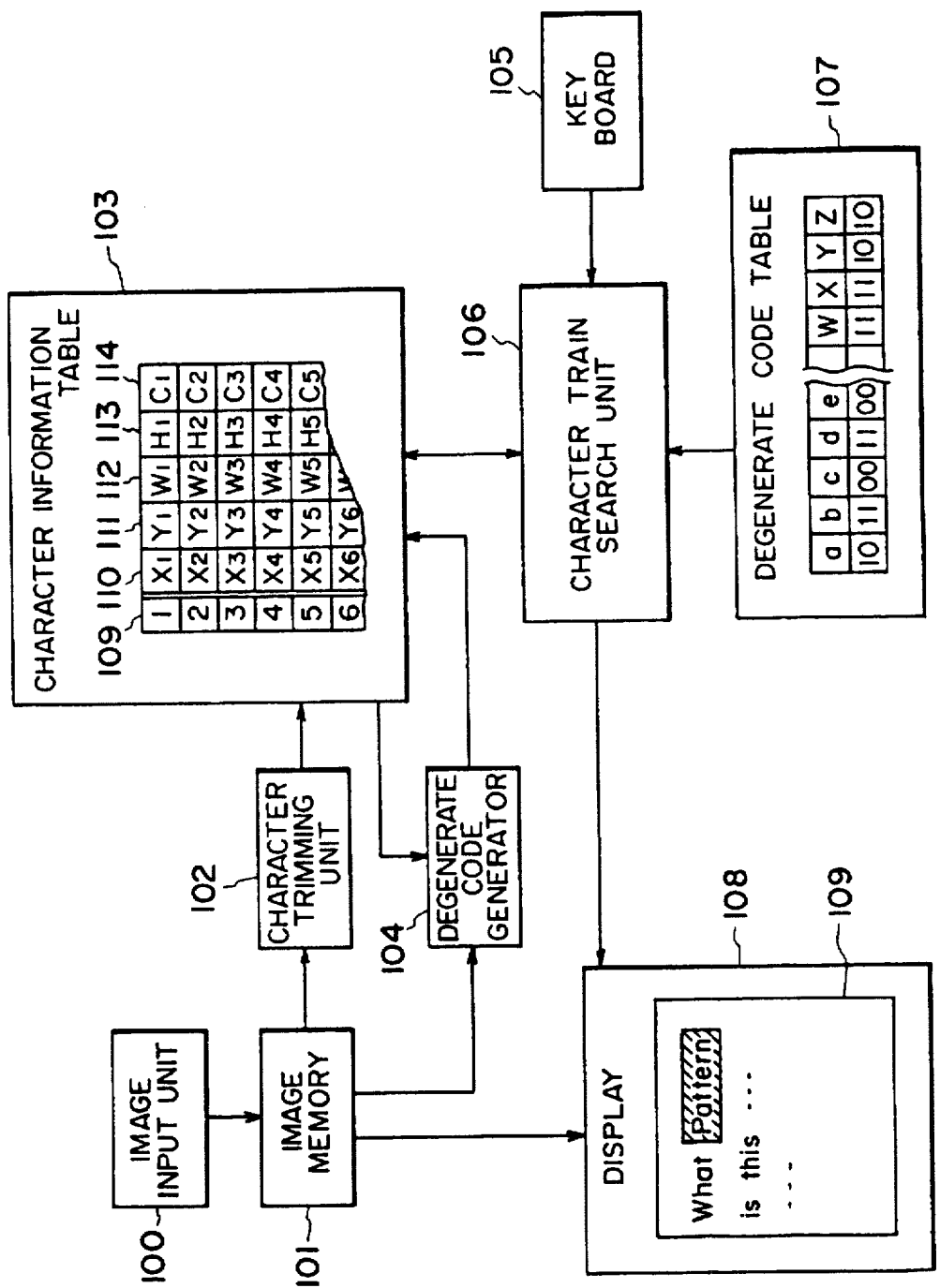
FIG. 1 is a block diagram of a character train search apparatus according to a first embodiment of the present invention.

FIG. 1 shows a character train search apparatus according to a first embodiment of the present invention. The apparatus includes an image input unit 100 for inputting an image pattern including sentences, an image memory 101 for storing image data read by the image input unit 100, a character trimming unit 102 for trimming the area of each character pattern stored in the image memory 101, a degenerate code generator 104 for generating a degenerate code corresponding to each trimmed character, a character information table 103 for storing coordinate values and degenerate codes of the trimmed character areas, a keyboard 105, a character train search unit 106 for searching a character train in input sentences input as an image, a degenerate code table 107 for storing characters input from the keyboard 105 and degenerate codes corresponding to the input characters, and a display 108 for displaying contents of the image memory and the character string search results. The image memory 101 and the character information table 103 comprise programmable RAMs, and the degenerate code table 107 comprises a ROM.

The image input unit 100 is started to read a sentence image and converts the image into binary data. The binary data is stored in the image memory 101. The image memory 101 has a capacity for storing image data of at least one page. The contents of the image memory 101 are displayed on a display screen 109 in the image display 108. The character trimming unit 102 projects the image data stored in the image memory 101 to trim an area of each character. Various types of known character trimming techniques are available, and a detailed description thereof will be omitted.

Figure 2:
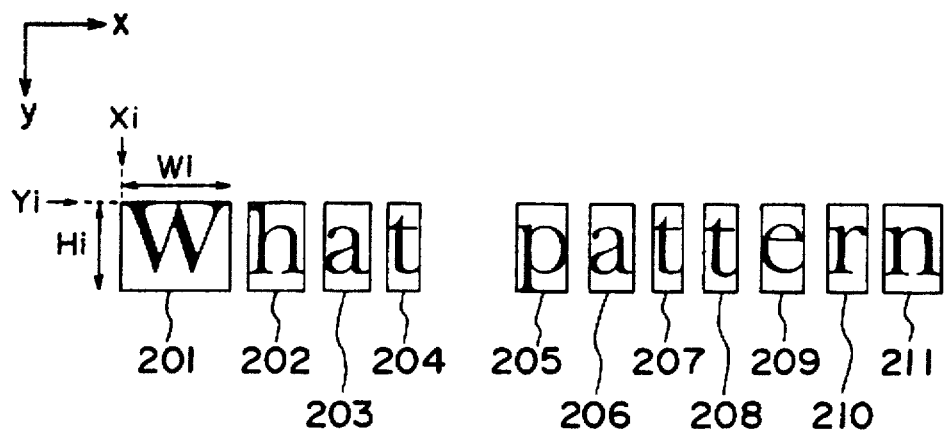
FIG. 2 is a view showing trimming of character images.

FIG. 2 shows trimmed character patterns. The characters are trimmed as rectangular areas 201 to 211 each represented by an x-coordinate value Xi of a black pixel at the leftmost end of the character pattern, a y-coordinate value Yi of a black pixel at the uppermost end of a plurality of character patterns on one character train, the number Wi of pixels of each character along the x-axis, and the number Hi of pixels of each character along the y-axis. The number Hi, i.e., a height Hi corresponds to a length up to the y-coordinate of the black pixel at the lowermost end of the plurality of character patterns on one character train. The trimming results of the respective characters are stored in the character information table 103 in an order of appearance. The character information table 103 comprises a character number column 109 for identifying the respective characters, columns 110 to 113 for storing the data Xi, Yi, Wi, and Hi, and a degenerate code column 114 (to be described later). Xi, Yi, Wi, and Hi of the respective trimmed characters are stored in the columns 110, 111, 112, and 113 from character number 1 in an order of character appearance. A numeric value which cannot be assumed to be a coordinate value, a width, and a height, e.g., a numeric value "−1" is written in each of the end columns 110 to 113 to indicate the end of data.

Figure 3:
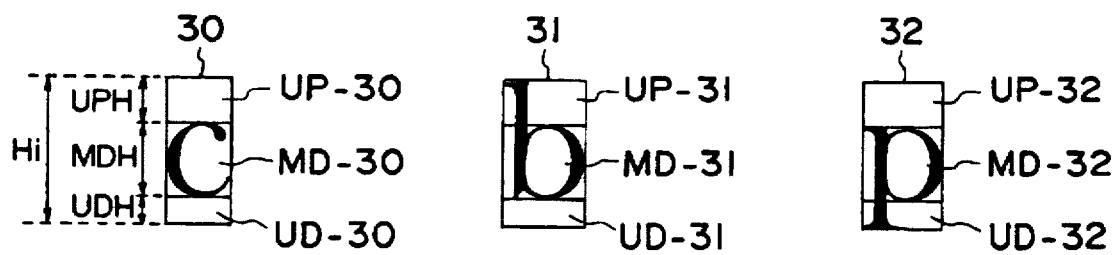
FIG. 3 is a view for explaining a method of generating a degenerate code.
Figure 4A:
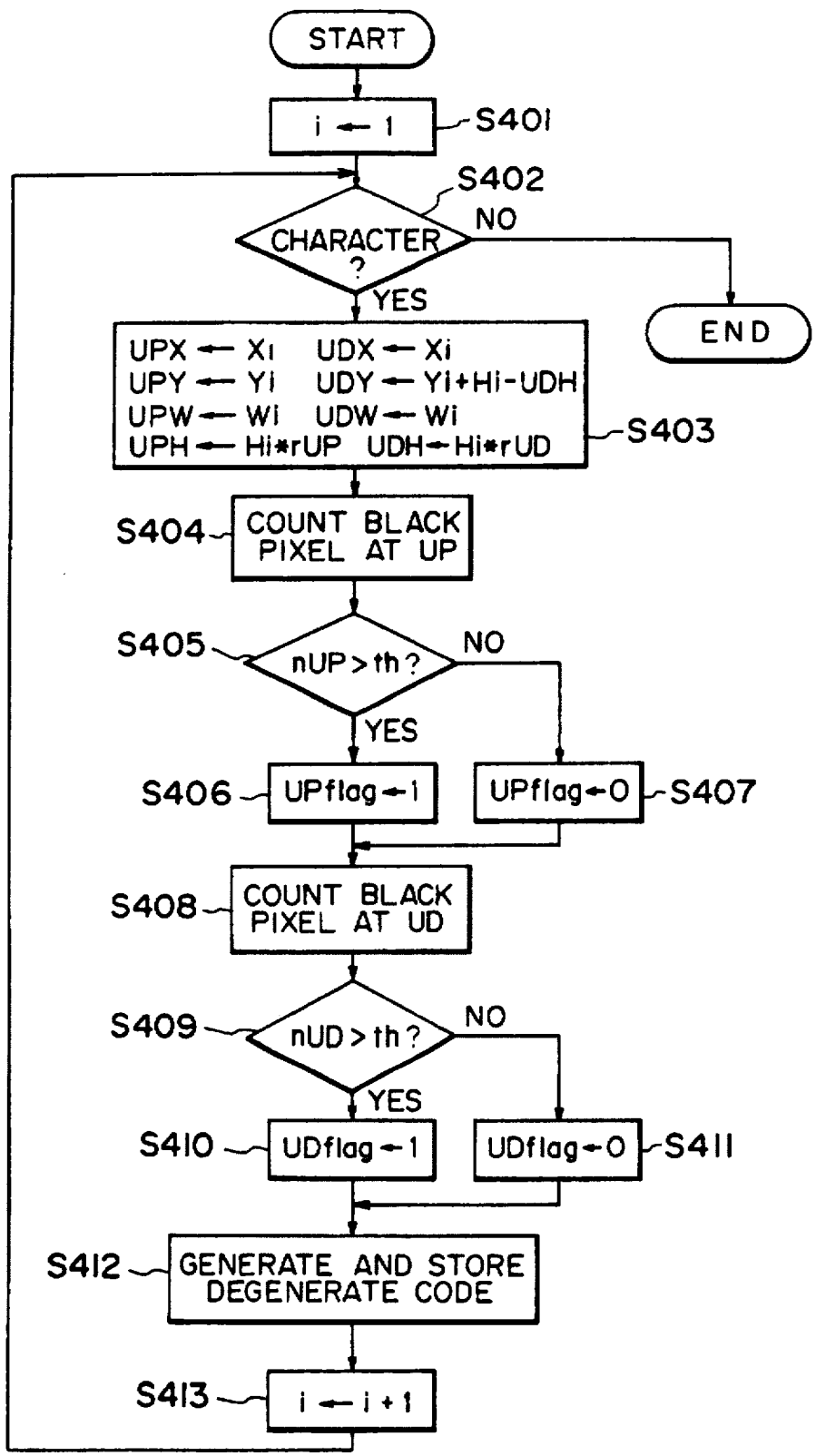
FIGS. 4A and 4B are a flow chart for explaining generation of a degenerate code and maps of main registers and memories, respectively.
Figures 4B, 5:
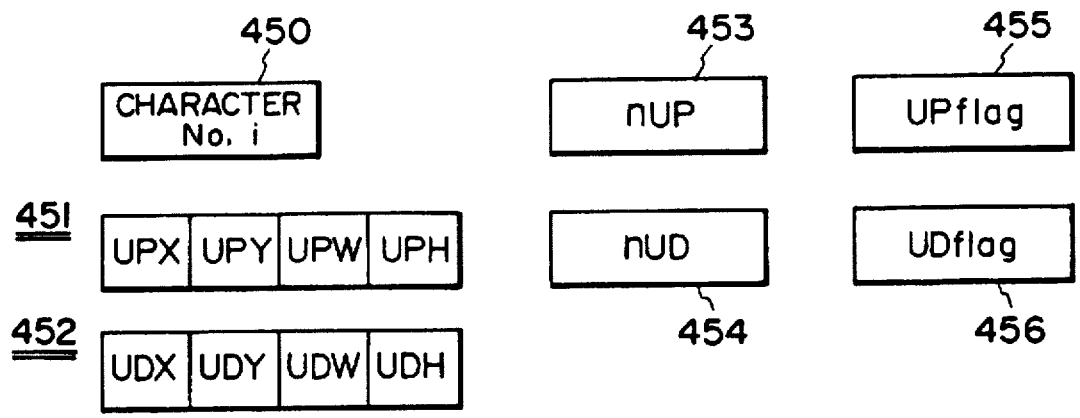
FIG. 5 is a table showing the degenerate code.

The degenerate code generator 104 generates a 2-bit degenerate code. FIG. 3 shows a method of generating the degenerate code. Trimmed areas 30 to 32 are divided into upper portions UP_30 to UP_32, middle portions MD_30 to MD_32, and under portions UD_30 to UD_32, respectively. A character pattern "C" in the rectangular area 30 does not have any patterns in the upper and under portions thereof. A character pattern "b" in the rectangular area 31 has a pattern in the upper portion. A pattern "P" in the rectangular area 32 has a pattern in the under portion. In this embodiment, one bit of the degenerate code is determined by the presence/absence of a pattern in the upper portion UP, and the other bit of the degenerate code is determined by the presence/absence of a pattern in the under portion UD. FIG. 4A is a flow chart for generating a degenerate code, and FIG. 4B shows registers and memories used in generation of the degenerate code. Character number i 450 is set at logic "1", i.e., initial setting, in step S401. It is determined in step S402 whether data of the character number i in the character information table 103 is valid. If an end of data is detected, processing is ended. Otherwise, the character rectangular area is divided into the upper portion UP, the middle portion MD, and the under portion UD in step S403. Position information 451 of the upper portion UP and position information 452 of the under portion UD are set. The rUP and rUD values in step S403 represent a height UPH of the upper portion and a height UDH of the under portion and represents a height ratio when the height Hi of each character rectangular area is given as 1. Since the rUP and rUD values are almost constant regardless of the types of lowercase fonts, optimal values are preset.

The number of black pixels UPX, UPY, UPW, and UPH in the upper area UP in the image memory 101 is counted in step S404. A count value nUP is stored in a register 453. If the count nUP representing the number of black pixels is larger than a threshold value th in steps S405 to S407, the presence of a character pattern in the upper portion is detected, and an UPflag 455 is set at logic "1". Otherwise, the UPflag 455 is set at logic "0". The threshold value th is a value for preventing an erroneous decision when part of the pattern in the middle portion MD enters the upper portion UP. The threshold value th is given beforehand. According to another method of preventing the erroneous decision described above, the value UPH is given as a value smaller by a few pixels corresponding to an expected positional error when the areas UPX, UPY, UPW, and UPH of the upper portion are determined.

The UDflag 456 is set according to the number of black pixels included in the under portion UD in steps S408 to S411 in the same manner as in steps S404 to S407.

A 2-bit degenerate code is generated according to the values of the UDflag and UPflag in step S412. The generated 2-bit degenerate code is stored in a degenerate code column 114 corresponding to the character number i in the character information table 103.

FIG. 5 shows one-to-one correspondence between the values of the UDflag and the UPflag and the degenerate codes. For example, if the UDflag is set at logic "0" and the UPflag is set at logic "1", a character such as "b" is given wherein no pattern is present in the under portion but a pattern is present in the upper portion. This character has degenerate code "01".

Figure 6A:
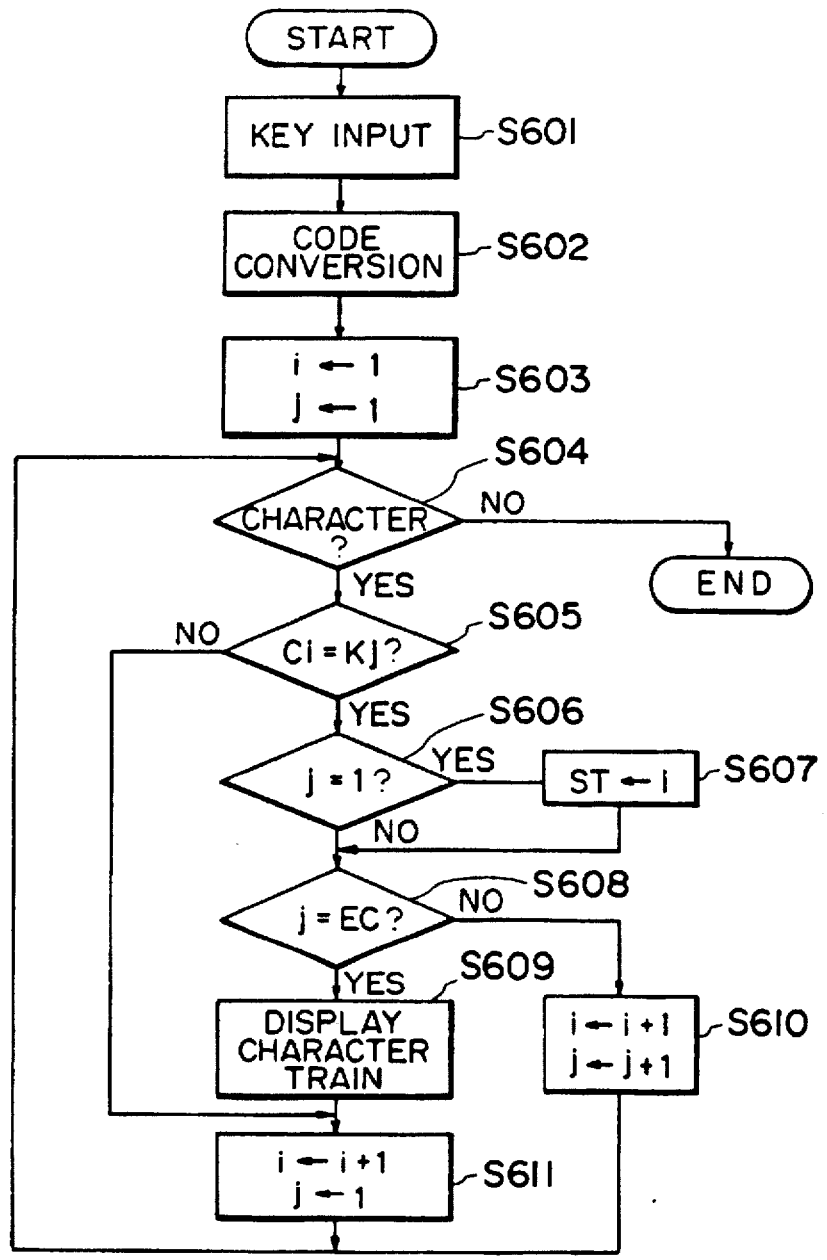
FIGS. 6A and 6B are a flow chart for explaining character train search processing and maps of main registers and memories, respectively.
Figure 6B:
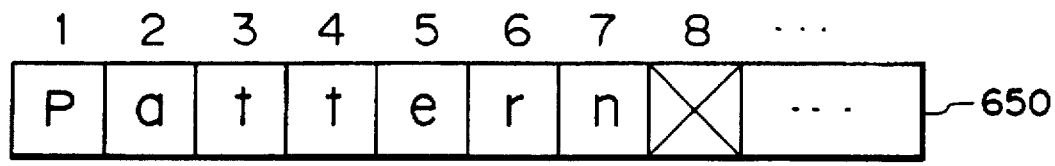
Figure 6B:
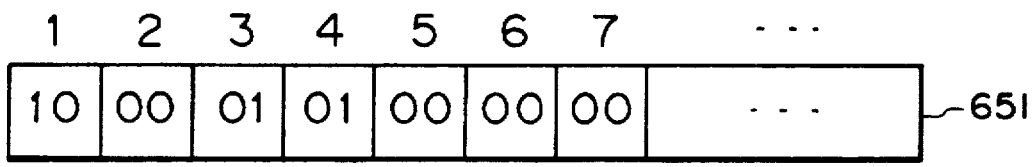
Figure 6B:
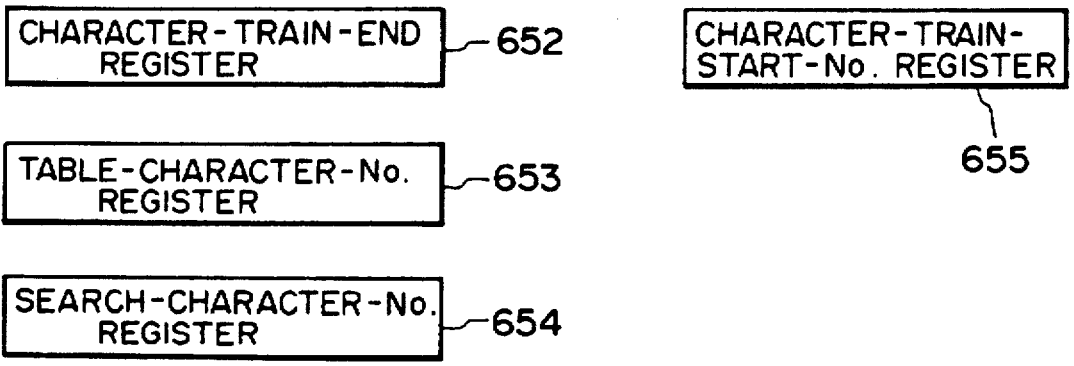

By the above operations, the character information table is completed, and character train search processing is then started. FIG. 6A is a flow chart of search processing, and FIG. 6B shows registers and memories which are required for search processing. An operator enters a desired character train of interest at the keyboard in step S601 and depresses a key for designating the start of search. The input character train is stored with a character string end character in a key buffer 650. FIG. 6B shows a state when a character train "pattern" is input. Although the characters are illustrated in FIG. 6B, standard character codes such as ASCII or JIS codes are stored in practice from a storage column 1. A storage column 8 represents the character train end character. In step S602, the degenerate code table 107 is accessed using the character codes (address data) of the standard character code train stored in the key buffer 650 to read out the corresponding degenerate code. The readout degenerate code is stored in the degenerate code buffer 651. The degenerate code table 107 is prepared by classification according to a method of generating a degenerate code corresponding to each standard character code.

FIG. 7 is a table showing the classification of degenerate codes corresponding to lower-case letters in this embodiment. Upper-case letters are assigned with codes "01". Even if numeric values and the like are added to the degenerate code table, the character train search of sentences primarily including lower-case letters is not adversely affected. In step S602, a storage column number EC (EC=7 in FIG. 6B) of the end letter in the degenerate code buffer is stored in a character-train-end register 652.

In step S603, the character number i given as a value of a table-character-no. register 653 and stored in the character information table 103 and a character number j given as the value of the search-character-no. register 654 and stored in the degenerate code buffer 651 are initialized to logic 1.

Information represented by the character number i and stored in the character information table 103 is determined to be an end of data or not in step S604. If the end of data is detected, this processing is ended. Otherwise, it is then determined in step S605 whether a degenerate character code Ci given by the character number i and stored in the character information table 103 is equal to the degenerate character code given by the character number j and stored in the degenerate code buffer 651. If NO in step S605, the number i is increased in step S611, and the number j is reset to 1. The flow then returns to step S604. If the number i is determined to be equal to the number j, it is then determined in step S606 whether the number j is 1. If j=1, then a value ST in the character-train-start-no. register 655 is set to i in step S607.

It is determined in step S608 whether the number j is the same as the end character number EC in the degenerate code buffer. If NO in step S608, both the numbers i and j are increased in step S610. The flow returns to step S604, and a coincidence between the next characters will be checked. If j=EC in step S608, the input character train matches with the character train of interest. The character rectangular areas represented by character numbers from ST as a value of the character-train-start-no. register 655 to the current character number i are displayed on the display 108 by black-and-white inversion with reference to the character information table 103 in step S609. Therefore, the searched character string is displayed to the user. After the operation in step S611 is performed, the flow returns to step S604, and the next character train is searched. By repeating the above operations, all character trains matched with the degenerate code character trains are selected.

(Second Embodiment)

Figure 8A:
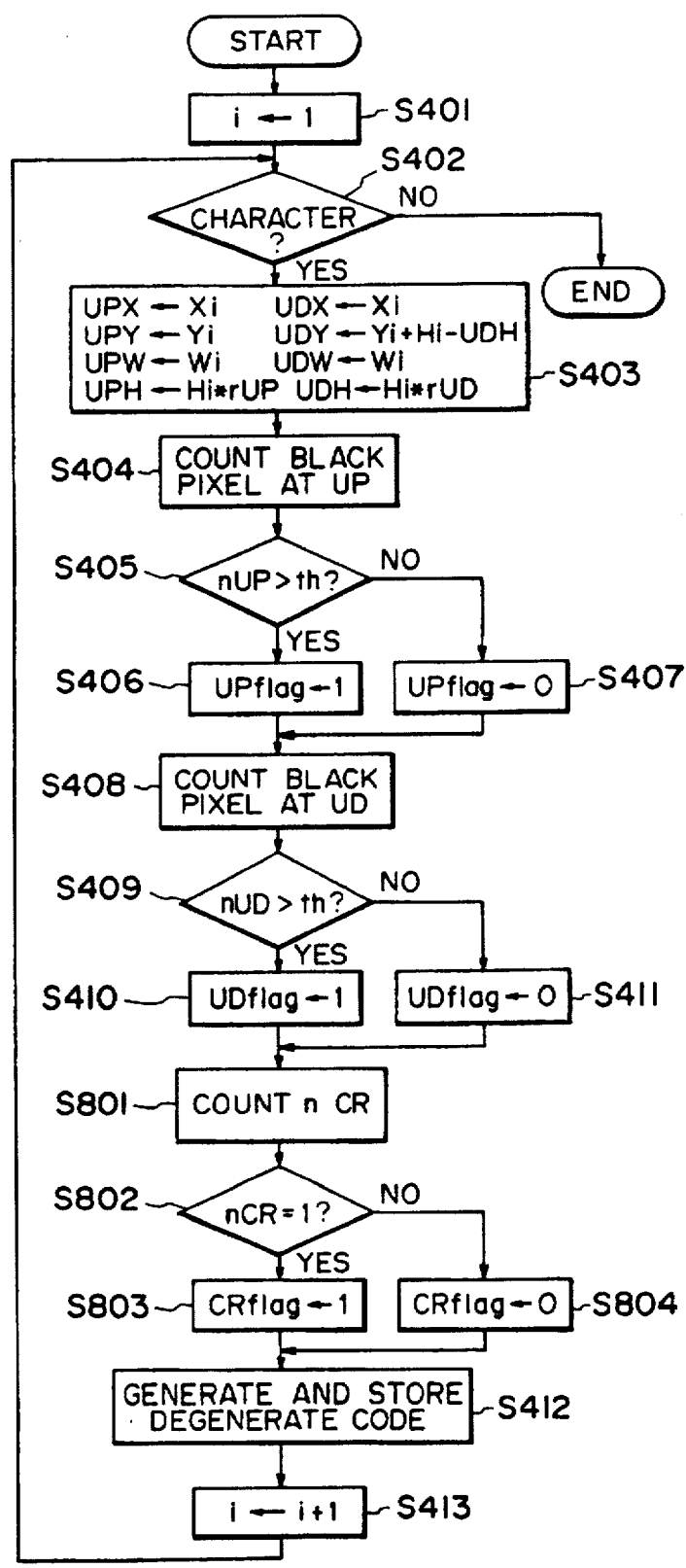

FIG. 8A is a flow chart for generation of the degenerate code. Steps S801 to S804 are added to the steps in processing of the first embodiment, and the content of step S412 is modified. FIG. 8B shows additional registers to be used in processing of the second embodiment.

In step S801, by referring to the character rectangular areas stored in the character information table 103, a number nCR of each character pattern is counted. The number nCR is stored in an nCR register 851. FIG. 10 shows a method of obtaining the number nCR. Characters 1000 to 1003 have middle portions MD__1000 to MD__1003. The numbers nCR are obtained such that the y-coordinate pixels of central lines CY__1000 to CY__1003 are scanned in the image memory 101 and are determined by the numbers of successive black pixels. In the characters 1000 and 1001 in FIG. 10, the numbers nCR are 1 each. In the characters 1002 and 1003, the numbers nCR are 2 each. If the number nCR is 1, the CRflag 850 is set at logic "1"; otherwise, the CRflag 850 is set at logic "0" in steps S802 to S804. In step S412, the 2-bit degenerate codes are generated in accordance with the table in FIG. 9, and the generated codes are stored in the character information table 103. The right bit of the degenerate code is determined by the UDflag and the UPflag. UDflag and VUPflag are obtained when both the UDflag and the UPflag are set at logic "0". However, UDflag and VUPflag are obtained when one of the UDflag and the UPflag is set at logic "1" so as to set the right bit at logic "1".

The left bit of the degenerate code is set at logic "0" when the value of the CRflag is set at logic "0". Otherwise, the left bit is set at logic "1".

FIG. 11 shows degenerate codes corresponding to lower-case characters stored in the degenerate code table. In this embodiment, the degenerate code table is not limited to that for lower-case characters but may be extended to a table for other characters in accordance with the degenerate code generation scheme of this embodiment.

As described above, another classifying means utilizing nCR is used in addition to a character pattern classification method utilizing the upper and under portions of the character to generate a degenerate code. As shown in FIG. 11, as compared with the first embodiment, the number of characters assigned to one degenerate code can be equal to that assigned to another degenerate code. Therefore, a hit ratio in character train search can be improved although the length of the degenerate code is not changed.

(Third Embodiment)

In this embodiment, a degenerate code is given as a 3-bit code.

Each degenerate code is generated by using the CRflag, UDflag, and UPflag in the second embodiment. FIG. 12 shows the one-to-one correspondence between the flags (i.e., the CRflag, the UD flag, and UPflag) and the degenerate codes. FIG. 13 shows degenerate codes corresponding to the characters in the degenerate code table for lower-case letters in this embodiment. The lower-case letters are generally classified into six types of letters, which leads to more accurate processing than a classification technique using the four types of letters.

(Fourth Embodiment)

Figure 14:
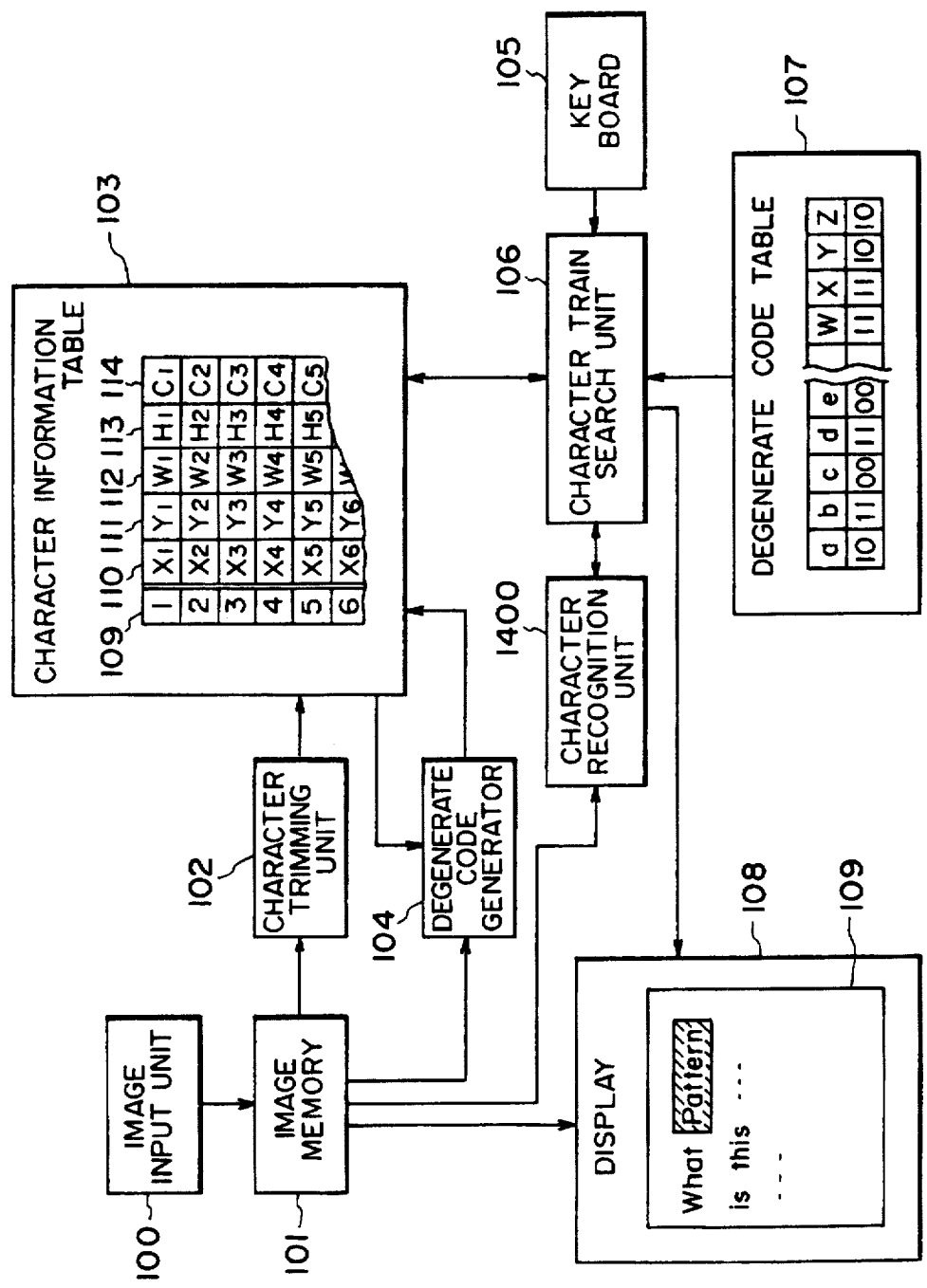
FIG. 14 is a block diagram of a character train search apparatus according to a fourth embodiment of the present invention.
Figure 15A:
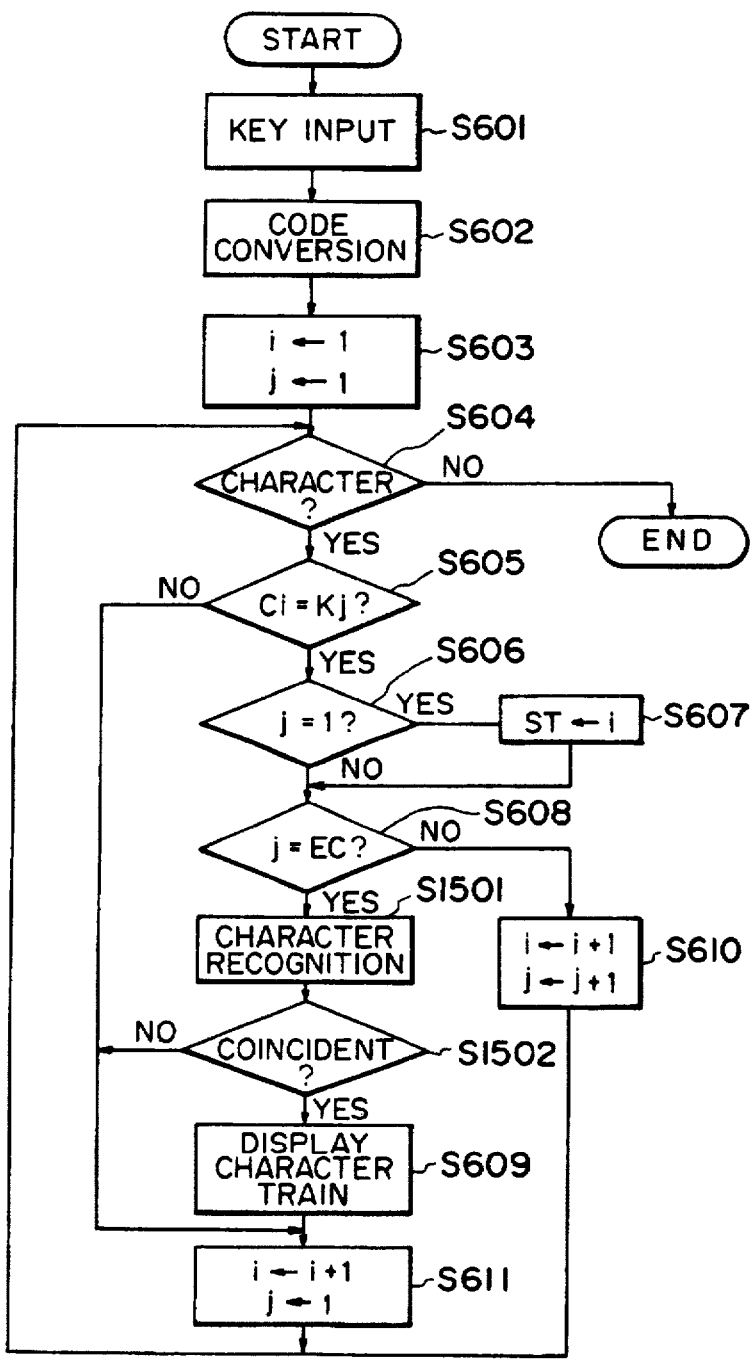
FIGS. 15A and 15B are a flow chart for explaining character train search processing and a map of the main buffer according to the fourth embodiment.
Figure 15B:
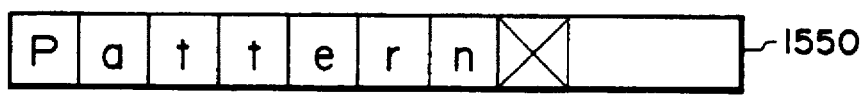

FIG. 14 is a block diagram of a character train search apparatus according to this embodiment. A character recognition unit 1400 is added to the apparatus of each of the first to third embodiments. The character recognition unit 1400 may be any apparatus which can convert a character pattern into a standard character code (ASCII or JIS code) and can comprise a known character recognition unit. FIG. 15A is a flow chart for character train search processing. An additional character recognition step S1501 is added to the flow chart of FIG. 6A. FIG. 15B shows a buffer used for character train search processing. In the character recognition step S1501, the respective character patterns stored in the image memory 101 are recognized by the character recognition unit 1400 in accordance with information of the respective characters given by character numbers ST to i in the character information table 103. The standard character code train is stored in a recognition code buffer 1550. In step S1502, the contents of the recognition character code buffer 1550 are compared with those of the key buffer 650. If a coincidence is established in the above comparison, the character train is displayed in step S609. Otherwise, the operation in step S611 is performed and the flow advances to the next character train search operation.

According to this embodiment as described above, by adding the character recognition unit for converting the character patterns into the standard character codes, accurate character search can be performed. For example, the technique of this embodiment is effective to automatically convert a given character train into another character train at once.

The search results in the first to fourth embodiments are displayed on the display. However, the character number of the coincided character train may be stored in a memory.

The degenerate code is not limited to a 2- or 3-bit code but can be determined in accordance with the number of character patterns.

At least one simple image processing step is performed for each character pattern trimmed from a sentence image, and a degenerate code having a few bits is generated for each character pattern. The degenerate code trains are checked to determine whether they coincide with each other. Without arranging the conventional character recognition means, a desired character train can be searched from the input sentence image. One degenerate code generally corresponds to a plurality of characters. If the number of characters constituting a character train is increased, the correspondence between the degenerate code train and the character train is improved, thereby obtaining a satisfactorily accurate search result.

When an accurate character train search result is required, a first search means is used to search utilizing a degenerate code train. The resultant character train is then recognized by the character recognition unit as a second search means, thereby obtaining a final search result. In this case, the characters to be recognized by the character recognition unit can be greatly limited by the degenerate code train. As a result, search processing efficiency can be improved, and particularly, a great effect can be obtained when a large number of sentence images subjected to search processing are input.

An embodiment will be described wherein items for classifying the document contents from the input document images are extracted and stored, the correspondence between each extracted item and a main body describing the detailed contents of the corresponding item is established, and a desired main body is displayed upon search operation of the corresponding item. The items to be extracted may be determined by the degenerate bits described above.

(Fifth Embodiment)

Figure 17:
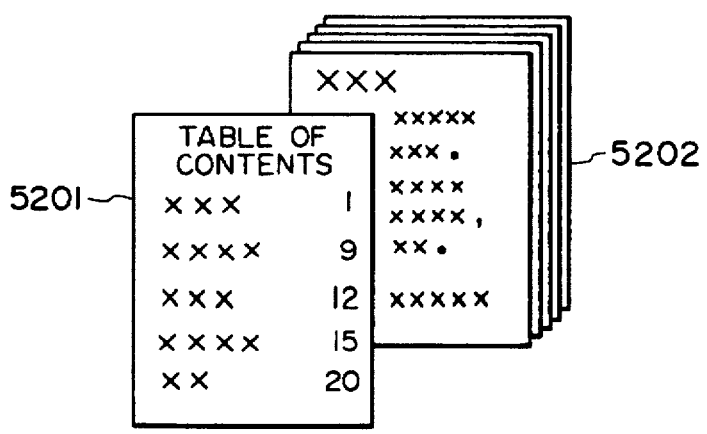
FIG. 17 is a view showing a document example according to the fifth embodiment.

FIG. 17 shows a document used in this embodiment. Each document (e.g., a book) having pages consisting of a page 5201 representing the table of contents and a main body 5202 consisting of a plurality of pages. On page 5201, items and page numbers of the main body to the right of the items are printed. The main-body pages describe the detailed contents of the items. In this embodiment, an image representing the table of contents of a document input as an image is displayed on a display. When the user points at an item for a desired main-body page with a coordinate pointer on the screen, the desired content is displayed on the display.

Figure 16:
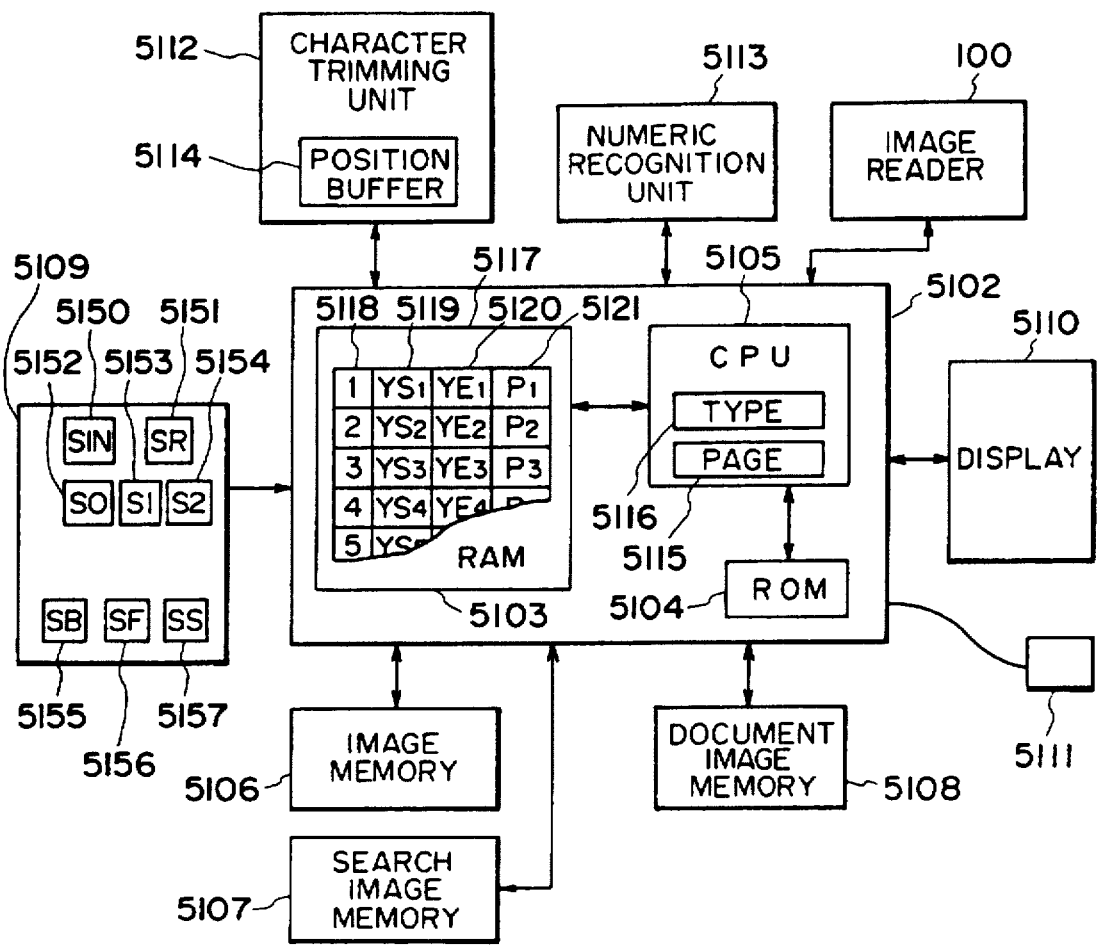
FIG. 16 is a block diagram of a character train search apparatus according to a fifth embodiment of the present invention.

FIG. 16 is a block diagram of a circuit arrangement of this embodiment. An image reader 100 reads an image and converts it into an electrical signal, a binary signal of logic "1" or "0". The binary signal is input to a control unit 5102. The control unit 5102 comprises a RAM 5103, a ROM 5104 for storing programs, and a CPU 5105. An image memory 5106 stores a one-page document image read by the image reader 100. A memory 5107 stores an image representing a table of contents. A document image memory 5108 stores all pages of the read document. An operation unit 5109 includes operation switches 5150 to 5157. A display 5110 displays a document image. A character trimming unit 5112 trims each character from the image of the table of contents. A position buffer 5114 stores coordinate values of the trimmed character areas. A numeric recognition unit 5113 recognizes a numeric image pattern. The numeric value may be recognized by the above-mentioned degenerate code. A mouse 5111 designates a point on the screen in the display 5110 to obtain a desired screen position. A write pen may be used in place of the mouse. The CPU 5105 includes main registers 5115 and 5116.

This apparatus is divided into an input unit for receiving a document image and a display unit for displaying a document image. The input and display units are switched by a switch SIN 5150 in accordance with another program. When the switch SIN 5150 is turned on, the input unit program is initialized. However, when the switch SIN 5150 is turned off, the display unit program is initialized.

(Document Input Unit Control Program)

Figure 18:
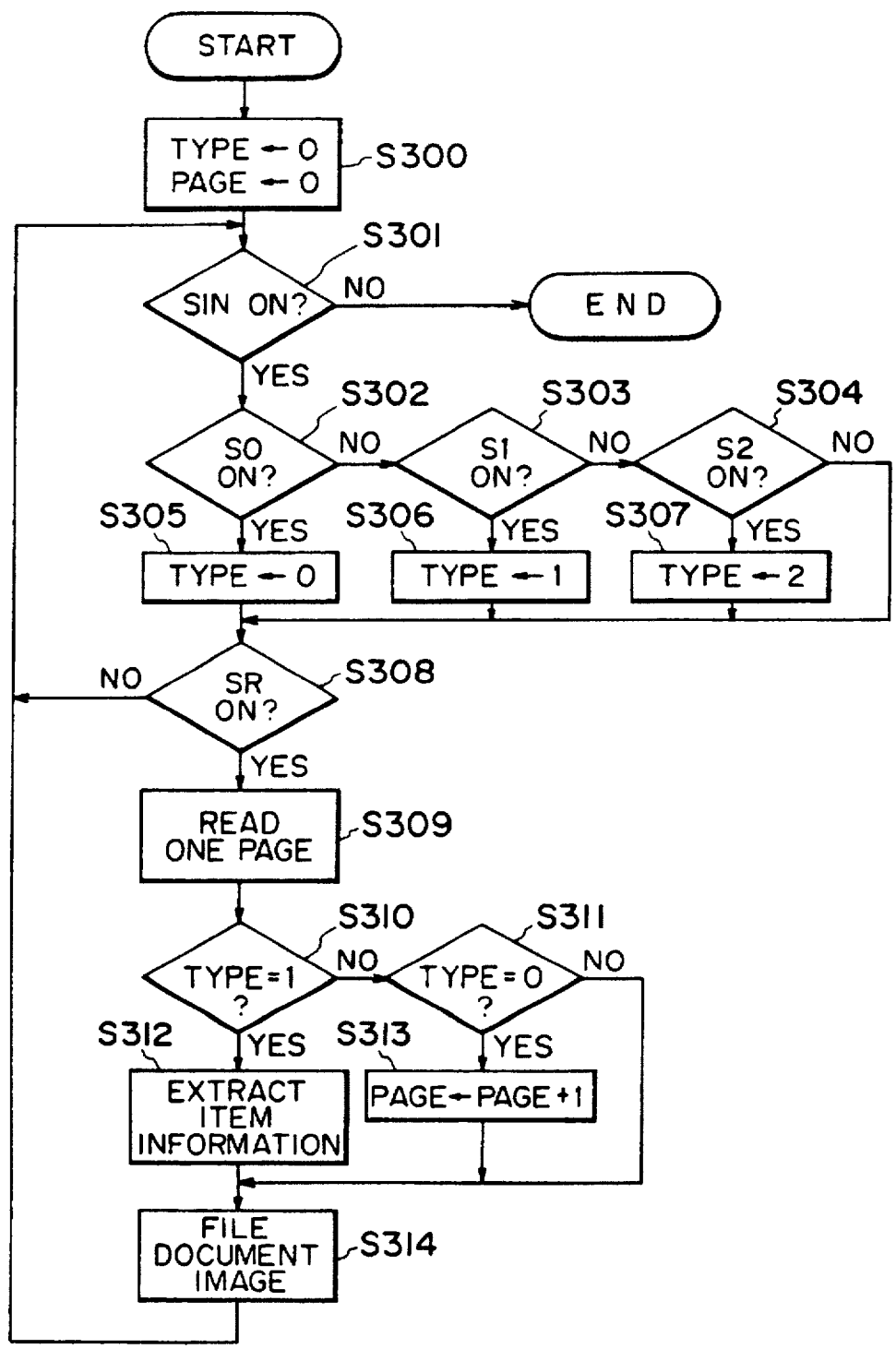
FIG. 18 is a flow chart showing document input unit control according to the fifth embodiment.

FIG. 18 is a control flow of a program running when the switch SIN 5150 is turned on. In step S300, values TYPE and PAGE in the registers 5116 and 5115, respectively, are initialized to zero. In step S301, if the switch SIN is kept off, the program is ended and the display unit program is initialized. However, if the switch SIN is kept on, the CPU 5105 determines in steps S302 to S304 whether switches S0 5152, S1 5153, and S2 5154 are turned on. If YES in steps S302 to S304, the corresponding values are set in steps S305 to S307, respectively. The switches S0, S1, and S2 are used to designate the types of originals read by the image reader 100. If an original to be read is a main body, the switch S0 is turned on. When the original to be read is the table of contents, the switch S1 is turned on. When the original to be read is a page such as a page (e.g., a cover) excluding the main body and the table of contents, the switch S2 is turned on. The values of TYPE are set to be 0, 1, and 2 which respectively correspond to the main body, the table of contents, and others.

The CPU 5105 determines in step S308 whether a switch SR 5151 is ON. The switch SR serves to designate initialization of the image reader 100. When the switch SR is turned on, the image reader 100 is started in step S309. Preset one-page image data is transferred to the control unit 5102. This image data is then stored in the image memory 5106. Operations in steps S312 and S313 are performed when the decision blocks in steps S310 and S311 represent that TYPE is 0 or 1. More specifically, if TYPE is 1, i.e., the read original image is an image of the table of contents, the item area and the numeric values to the right of the items are recognized from the image of the table of contents in step S312 (to be described in detail later). If TYPE is 0, i.e., the read image represents the main body, PAGE is incremented by one. However, if TYPE is 2, no operation is performed and the flow advances to step S314.

In step S314, both an identification number representing that the content of the image memory is the main body or the table of contents and a header portion describing the page are stored in a document image memory 5108 as an external memory.

FIG. 19 shows a data format of one page stored in the document image memory 5108. The data format consists of an image data portion 401, and an identification number portion 402 of a header portion which distinguishes between the main body, the table of contents, and the others. TYPE is used as the identification number. The data format also includes a main body page portion 403 which stores the value PAGE of the register 5115.

By repeating the above operations from the first page to the last page while an image of each page is set in the image reader, the document can be stored as image data. Of course, when separate originals are available, they may be fed to the image reader by an ADF.

The operation in step S312 will be described below.

The character trimming unit 5112 is operated to extract a character area from the image of the table of contents stored in the image memory 5106 in step S312. FIG. 20 is a view for explaining the behavior of the character trimming unit. Characters 501 to 503, 505 and 506 in the character patterns stored in the image memory 5106 are item characters, and characters 504, 507 and 508 are page characters. When the entire image representing the table of contents is projected along the y-axis, a hystogram 510 is obtained. A portion having a continuous occurrence frequency represents a character train. An upper end $YT_i$ ($i \geq 1$) and a lower end $YB_i$ of each portion having a continuous occurrence frequency are calculated. When a character train image defined by the ends $YT_i$ and $YB_i$ is projected along the x-axis, left end x-coordinates $XS_j$ and $XE_j$ ($j \geq 1$) of each character pattern can be obtained (not shown). The resultant character pattern area is stored in the position buffer 5114. FIG. 21 is a view showing contents of the position buffer 5114. Coordinate values $YS_j$, $YE_j$, $XS_j$, and $XE_j$ (X positions in the first character train) of each character are stored. The values $YS_j$ and $YE_j$ are values of YT and YB for a train where the character j is present. A data end symbol "END" is stored at the end portion of the data. Data "−1" or the like is used as the data END. A column 601 is a column of a character number.

(Item Table Creation Program)

Figure 22:
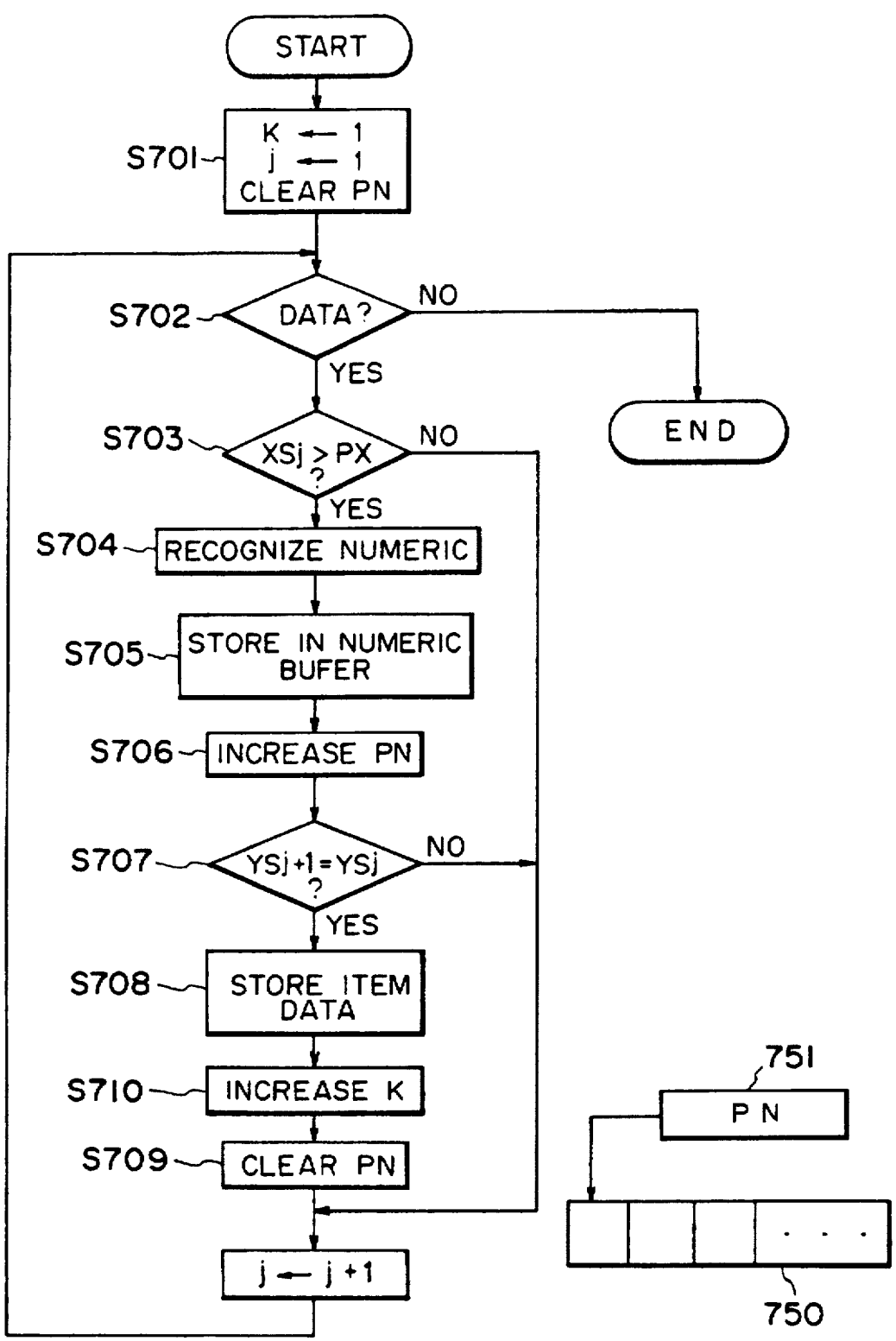
FIG. 22 is a flow chart for generating an item table.

The control unit 5102 recognizes the characters representing the page in the data stored in the position buffer 5114 and stores the recognition results in the item table 5117. FIG. 22 is a control flow of this operation.

In step S701, the value j representing the character number in the position buffer 5114 is set to be 1, and the value k representing the item number in the item table 5117 is set to be 1. A value PN of the register 751 which represents the storage location of a numeric buffer 750 is set to designate the start position of the numeric buffer 750. The numeric buffer 750 is allocated in the RAM 5103, and the register 751 uses a register in the CPU. The k and j values can be set by registers in the CPU (this setting operation is not shown).

The CPU determines in step S702 whether data of the character number j in the position buffer 5114 represents an end of data, i.e., END. If YES in step S702, this program is ended. Otherwise, the CPU determines whether the left end x-coordinate of the character number j is larger than a preset value PX. The preset value PX is properly determined by an item portion and an x-coordinate as a boundary of the page number located to the right of the item in the image of the table of contents. The boundary coordinate value may vary depending on the types of documents. Therefore, the image of the table of contents is displayed on a display at the time of input of the image of the table of content, and the boundary between the item and page is designated by a mouse or the like to determine the value of PX.

If condition $XS_j > PX$ is not established in step S703, i.e., if the character j is an item character, the value j is increased in step S710, and the flow advances to step S702. The CPU then determines the next character. However, if condition $XS_j > PX$ is established, i.e., if the character j is a numeric value of the page portion, the character j is recognized by the numeric recognition unit 5113 in step S704. The numeric recognition unit 5113 performs character recognition of a given image pattern in the area of the image memory 106 which is represented by $YS_j$, $YE_j$, $XS_j$, and $XE_j$ in the position buffer 5114 and sends ASCII character codes to the CPU 5105. In this case, the numeric recognition unit 5113 may be a conventional numeric recognition unit. In step S705, the character codes as a result of recognition are stored at a location in the numeric buffer 750 designated by PN. In step S706, PN is increased so as to represent the next numeric buffer storage position. The CPU then determines in step S707 whether the character j is the end character of the character train by comparing $YS_{j+1}$ with $YS_j$. If characters are still left to the right of the character j, the flow advances to step S710. However, if the character j is determined to be the end character of the character train, the data is stored in a storage area of the item number k in the item table in step S708. The item table 5117 consists of an item number column 5118, a y-coordinate column 5119 of the upper end of the item, a y-coordinate column of the lower end of the item, and a page column. The y-coordinates $YS_k$ and $YE_k$ of the upper and lower ends have the same values as those of $YS_j$ and $YE_j$ in the position buffer 5114. $P_k$ is a value obtained by converting into an integer a numeric value represented by a character code train from the start character to the immediately preceding character represented by the PN value in the numeric buffer 750.

The item number k is increased in step S710. The item number k is cleared in step S709 such that PN represents the start position of the numeric buffer. After the above operations, the flow advances to step S710. When the CPU determines in step S702 that the data is absent in the position buffer, this program is ended. The data END is stored at the end of the data in the item table in the same manner as in the position buffer, and the operation in step S312 is ended.
(Document Search Output Program)

Figure 23:
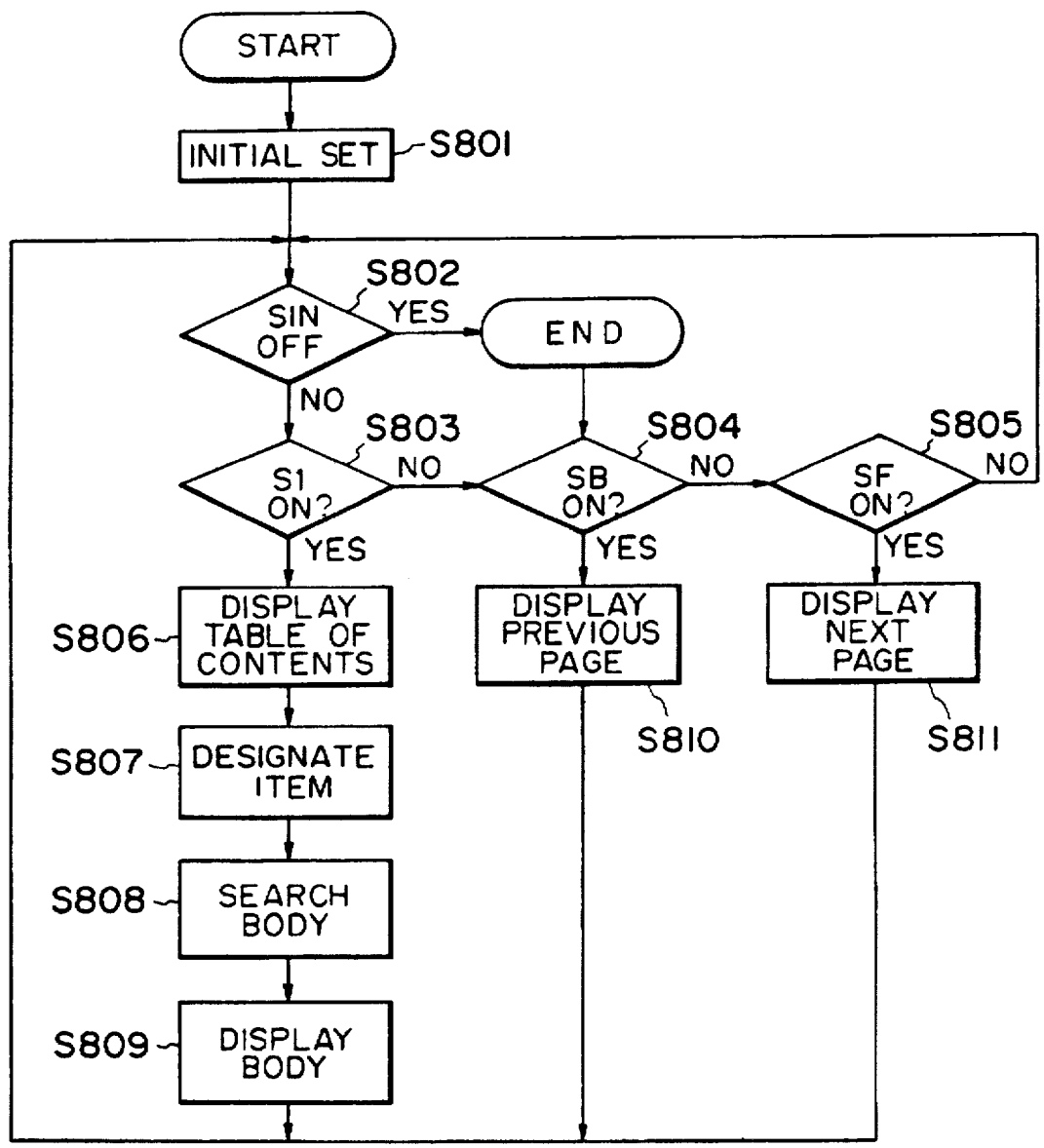
FIG. 23 is a flow chart for explaining a document search output according to the fifth embodiment.

FIG. 23 shows a control flow of a display unit program initialized when the switch SIN 5150 is kept off.

In step S801, a file pointer or the like for accessing a file in the document image memory 5108 is initialized. The CPU determines in step S802 whether the switch SIN is turned off. If YES in step S802, this program is ended, and the input unit program is started. If the switch SIN is kept on, the CPU determines in step S803 to S805 whether the switches S1, SB, and SF are turned on or off. If all switches are determined not to be turned on, the operation in step S802 is repeated. When the switch S1 is turned on, the table of contents is displayed on the display 5110 in step S806. The table of contents is displayed as follows. The pages are searched from the first page (i.e., the read number of the identification number of the header portion shown in FIG. 19 is 1, i.e., the page in which the image of the table contents is stored) in the document image memory 5108, the readout image data is transferred to the search image memory 5107, and the contents of the search image memory 5107 are displayed on the display 5110. In step S807, item designation is then performed.

Figure 24:
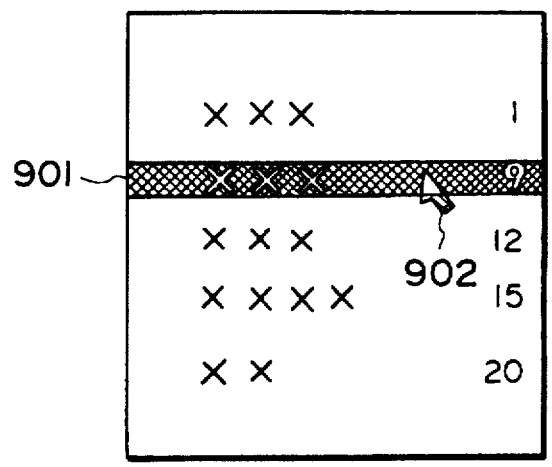
FIG. 24 is a view showing contents of a display screen.

FIG. 24 shows a display screen given by processing in step S806. A cursor 902 is shifted in the display screen by moving the pointing device 5111. The control unit 5102 monitors coordinate values of the cursor and searches the item number k defined between the y-coordinate $YS_k$ of the upper end and the y-coordinate of the lower end in the item table 5117. If such an item is detected, the item number is stored in an empty register in the CPU. An area between $YS_k$ and $YE_k$ on the display screen is displayed by black-and-white inversion so as to distinguish it from other areas, as illustrated by a black-and-white inversion portion 901. The user moves the cursor to the desired item and depresses a switch SS 5157 to select the desired item. A value $P_k$ in the page column 5121 in the item number k stored in the register in the CPU is set in the register 5115. In step S808, the value PAGE in the register 5115 is compared with the main body page portion of each header in the document file in the document image memory 5108, and the image data of the searched page is transferred to the image memory 5106. In step S809, the image of the main body stored in the image memory 5106 is displayed on the display 5110, and the flow returns to step S802.

When the switch S804 is ON in step SB, the value PAGE of the register 5115 is decreased in step S810, and the page coinciding with the PAGE is searched from the document file. The searched page is transferred to the image memory 5106, and its content is displayed on the display 5110. If the value PAGE represents 1, it is not decremented and the operation in step S810 is ended. The flow is then returned to step S802. When the switch SF 5156 is determined to be ON in step S805, the value PAGE is increased and an image of the main body on a page coinciding with the updated value PAGE is displayed.

In the processing flow of FIG. 23, the cover page cannot be displayed. However, the cover page is stored in the image file and is represented by identification number 2. If a switch for displaying the page represented by the identification number 2 is arranged, the cover page can be searched and displayed on the display.

In this embodiment, only one page is given for the page of the table of contents. However, in the document input program, a page register for the table of contents having the same function as PAGE is arranged and incremented every time the page of the table of contents is input, and an additional page column for the table of contents is arranged in the item table. The pages of the table of contents are stored at the time of item data storage, and the same switches as the switches SB and SF are arranged to display the pages of the table of contents at the time of document display. In addition, the page of the main body is obtained by the page of the table of contents which is currently displayed on the display and the coordinate values of the selected item at the time of item designation. With the above arrangement, a plurality of pages for the table of contents can be selectively displayed.

The item table may be stored in an external memory as in the document image.

As described above, when a document having a page of the table of contents and many pages of the main body is filed as an image, a means for recognizing and retaining the image of the page of the table of contents and the pages of the main body which correspond to the items is provided. The user can designate only a desired interesting item on the screen, and the page of the main body corresponding to the desired item can be immediately displayed on the screen. In addition, the pages adjacent to the desired interesting pages can be referred. Therefore, it is convenient for the user who checks a document consisting of many pages. In addition, the apparatus of this embodiment is effective for a user who wishes to refer to a specific portion.

(Sixth Embodiment)

Figure 25:
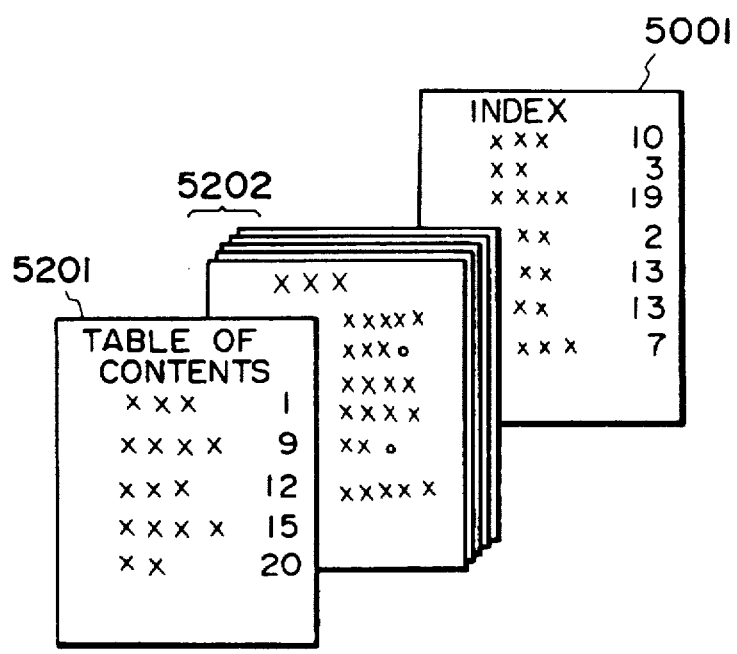
FIG. 25 is a view showing a document example according to a sixth embodiment of the present invention.

FIG. 25 shows a document used in this embodiment. In addition to the page of the table of contents, the document includes an index page 5001 listing main matter information described in the main body and alphabetically rearranged.

In this embodiment, the index page is displayed on the display and the user can designate a desired matter so to display the corresponding content of the main body in the same manner as in the case of the fifth embodiment wherein the image of the table of contents is displayed on the display and the user designates a desired item on the screen so as to extract the corresponding page of the main body.
(Document Input Unit Control Program)

Figure 26:
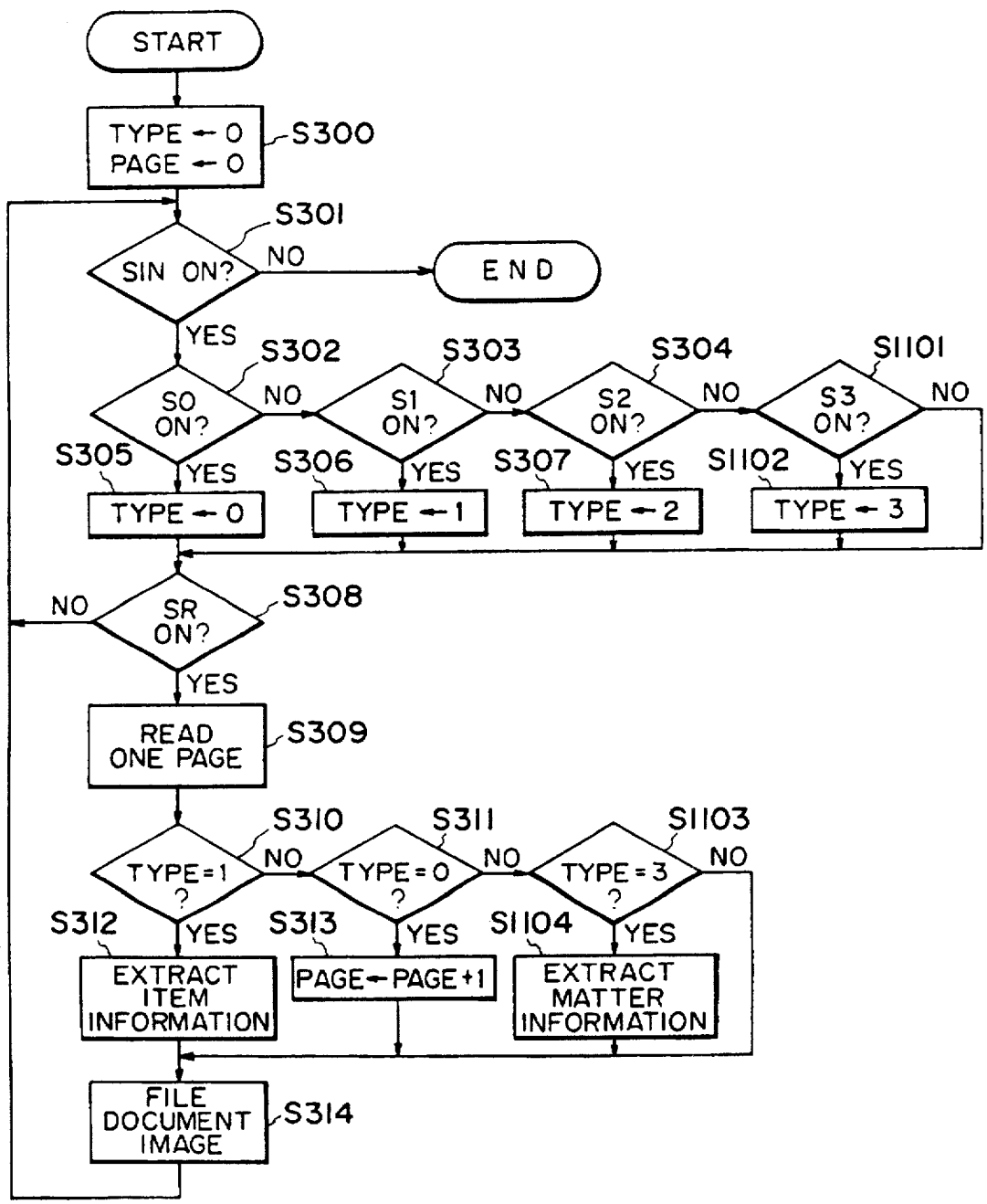
FIG. 26 is a flow chart of document input unit control according to the sixth embodiment.

FIG. 26 is a processing flow of a document input unit in this embodiment. This processing flow includes steps S1101 to S1104 in addition to the steps (FIG. 18) of the fifth embodiment. In the sixth embodiment, a switch S3 is added to an operation unit 109. When the user wishes to input an index page, he turns on the switch S3. When the switch S3 is determined to be ON in step S1101, the value TYPE in the register 116 is set to be 3. In step S1103, if the page is determined to be an index page, the area of each matter written in the index and the corresponding page are recognized in step S1104. The recognized data are stored in the RAM. Processing in step S1104 is the same as that (FIG. 22) of the fifth embodiment. Although the item information is stored in the item table 117 in step S708, a matter table is arranged in the RAM 5103 in addition to the item table. The page of the extracted matter and the page of the main body are stored in the matter table. In this embodiment, a coordinate value PX representing a boundary between the matter and the page is properly determined. Alternatively, the index image may be displayed at the time of index page input, and the boundary may be designated by the mouse.

If the numeral recognition unit 5113 has a function for rejecting characters excluding the numeric values, character patterns trimmed in each train of the index page serve as objects for the numeric recognition unit. A rightmost character train of the recognized continuous characters as numeric values may be used as a page for describing the main body.

(Document Search Output Program)

Figure 27:
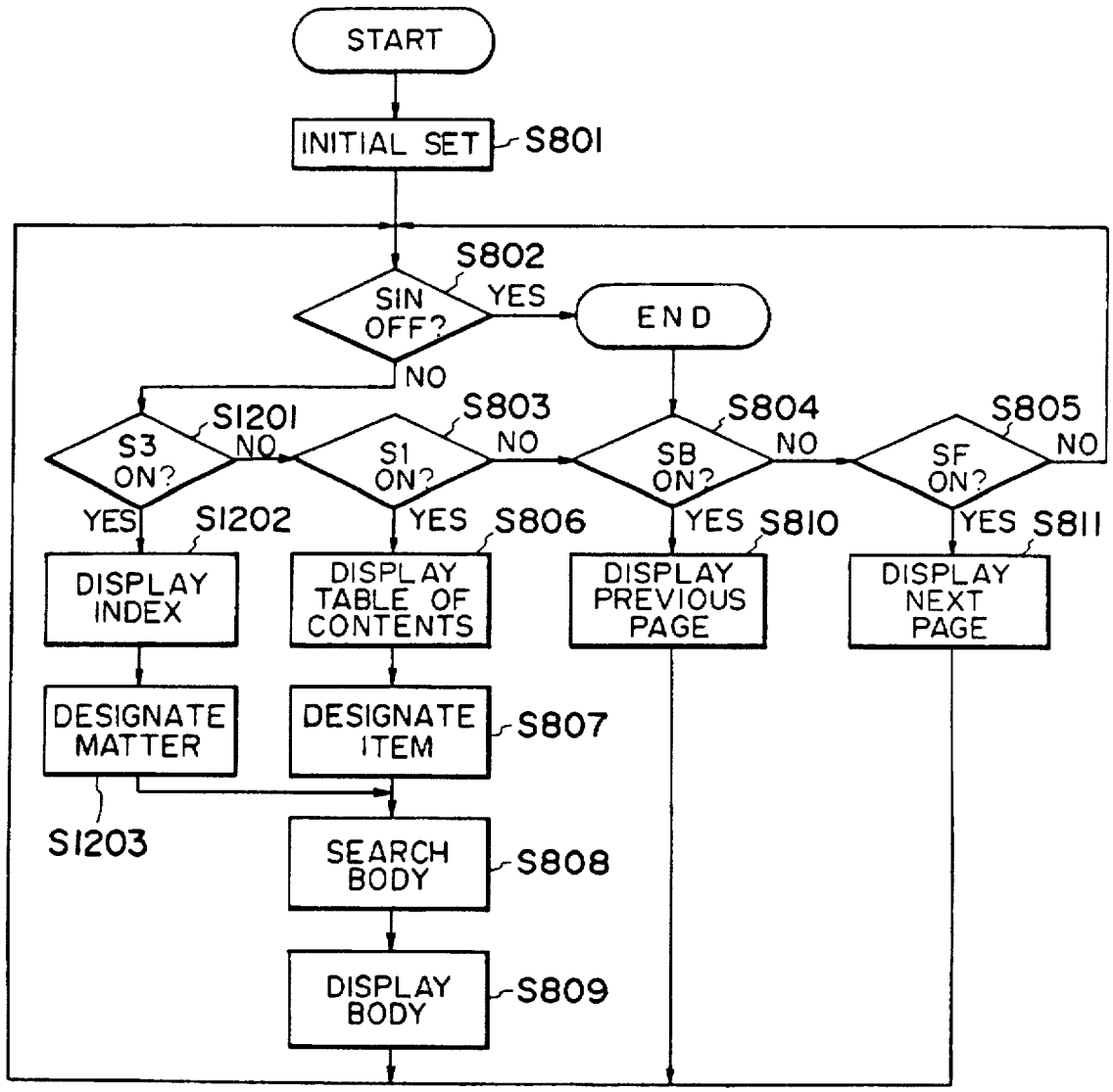
FIG. 27 is a flow chart of a document search output according to the sixth embodiment.

FIG. 27 is a processing flow of a document display unit in this embodiment. In addition to the steps (FIG. 23) of the fifth embodiment, steps S1201 to S1203 are added in the sixth embodiment. In the sixth embodiment, in order to access a desired page of the main body by referring to the index page, the user turns on the switch S3. The CPU determines in step S1201 whether the switch S3 is ON. If YES in step S1201, the index page is displayed on the display in step S1202. The identification number of the header portion in the image file is read out in the same manner as in display of the table of contents in step S806. An identification number of "3", i.e., the index page, is searched, and the image data on this page is transferred to the search image memory 5107. The contents of the search image memory 5107 are displayed on the display. In step S1203, the user selects a desired matter with a mouse. This processing is the same as that of step S807 except that the matter table is used in place of the item table used in step S807.

As described above, the index page is also used to designate the main body in addition to the page of the table of contents of the document, and a method of selecting a specific page of the main body can be diversified. Therefore, a page desired by the user can be properly referred.

(Seventh Embodiment)

Figures 28, 29:
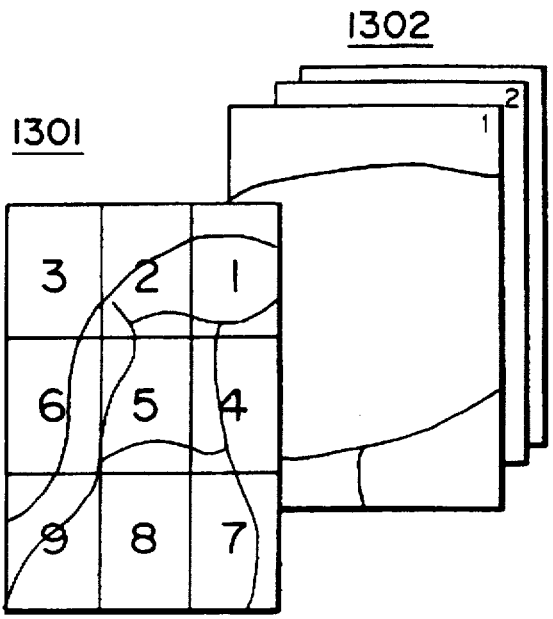
FIG. 28 is a view showing a document example according to a seventh embodiment of the present invention.
FIG. 29 is a view showing a map table according to the seventh embodiment.

FIG. 28 is a view of a map divided into a plurality of pages and used in this embodiment. The map has a page 1301 corresponding to the table of contents which draws geographical features and roads of all areas. The map in the page 1301 of the table of contents is divided into a plurality of areas illustrated on pages 1302 which describe details of the areas.

The map is input in accordance with processing (FIG. 18) of the fifth embodiment. In step S312, the divided areas on the page 1301 of the table of contents and the page numbers described in the corresponding areas are recognized and stored in the RAM. In this embodiment, the image of the table of contents is not a character train, and the character trimming apparatus is not started. The image of the table of contents is displayed on the display screen at the time of image input. A boundary of each area is designated by a mouse or the like to designate coordinates of each divided area.

The coordinate values need not accurately coincide with the boundary of each divided area but may roughly correspond to each divided area of the map. For example, when a boundary drawn in the map is a curve, the user can designate each divided area as a substantially rectangular area.

FIG. 29 is a map table 1401 allocated in the RAM. The map table 1401 corresponds to an item table 5117 in the fifth embodiment. The map table 1401 consists of a divided area number column 1402, a column 1403 of the left end x-coordinate of the divided area, a column 1404 of the right end of the divided area, columns 1405 and 1406 of y-coordinates of the upper and lower ends of each divided area. Coordinate values designated by the mouse or the like are stored. A page storage column 1407 stores pages of detailed maps of the divided areas. Each page is designated by the mouse such that coordinate values $XRS_i$, $XRE_i$, $YRS_i$, and $YRE_i$ of one divided area are stored, and a character area printed with a page is designated by a mouse or the like. The resultant image pattern is supplied to a numeric recognition unit.

After the map table is created and the map image is stored in it, the same processing as in the first embodiment will be performed, and a detailed description thereof will be omitted.

In this embodiment, the divided areas of the image of the table of contents and the areas having page numbers therein are designated by the user. When a color map is used, the boundary lines and the page numbers are printed in a color different from the colors used for drawing the geographic features and roads. An optical filter is attached to an image reader to input only patterns corresponding to the boundary lines and the page numbers. Then, lines and characters of the boundary lines and the page numbers can be recognized to automatically extract the boundaries and pages.

As described above, in a map divided into a plurality of pages in addition to a document consisting of only characters, the pages of the table of contents of the map can be displayed on a display, and a desired divided area can be read out from an image file and displayed on the screen.

(Eighth Embodiment)

Figure 30:
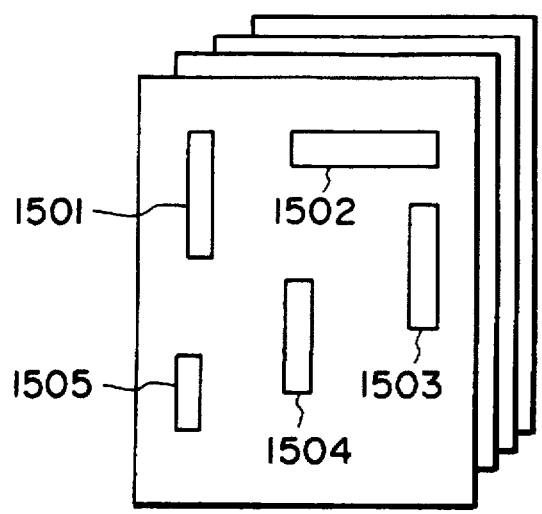
FIG. 30 is a view showing a document example according to an eighth embodiment of the present invention.

FIG. 30 shows a newspaper used in this embodiment. The newspaper consists of a plurality of pages. As compared with the general documents shown in the first and second embodiments, the newspaper consists of a smaller number of pages. The contents of the newspaper are sequentially read out page by page in order to find specific news while they are displayed on the display. This operation is not time-consuming. However, each page of the newspaper cannot be displayed on a currently available screen since each page is too large to display. The screen must be scrolled to read each page of the newspaper. In this sense, a total number of stored pages of the newspaper is large. Therefore, articles which are not associated with an article of interest must be checked, thus degrading operability.

In this embodiment, headline areas 1501 to 1505 of the newspaper are extracted, and their coordinates are stored in a table in the RAM. Each newspaper page is reduced such that only the headlines can be read. If the user finds an interesting headline, he designates it with a mouse. Therefore, the article corresponding to the selected headline can be displayed at a size which allows reading.

A headline trimming apparatus having a headline trimming unit in place of the character trimming apparatus 5112 repeats projections of the images on the y- and x-axes in the same manner as in the character trimming unit to a possibly dividable rectangular area. The size of the resultant rectangular area of the headline character is obviously different from that of the article character. The size of the rectangular area can be extracted by comparison between the headline characters. A rectangular area including all adjacent characters in the headline characters is used as a headline area.

The processing steps will be described below.

The value of the register 5115 is set to be "1", and the first page of the newspaper is set in the image reader 100. The user then turns on a switch SR 5151. The information on the first page of the newspaper is read and is stored in the image memory 5106.

The headline trimming unit is started, and the headline areas are trimmed. Coordinate values of the respective headline areas are stored in the table in the RAM. In this case, the same table as the table 1401 of the fourth embodiment is arranged. A value PAGE (1 in this state) of the register 5115 is stored in the page column. The image data of the image memory is stored together with the header portion in the document image memory 5108. The storage format is the same as that in FIG. 19. The identification number section 402 is not used in this embodiment. Nothing is stored, and the value PAGE of the register 5115 is stored in the page section 403. After the data is stored in the file, the value PAGE is increased, and the next page is input. The above operations are repeated to file the images of all pages.

The display unit will be described below.

The headline information stored in the table in the RAM is retrieved to reduce the image data of the headline area of the file to a proper size. Each headline is arranged at a proper position and is stored in the search image memory 5107. Only the headline areas are read out from the search image memory 5107 and displayed on the display 5110.

Figure 31:
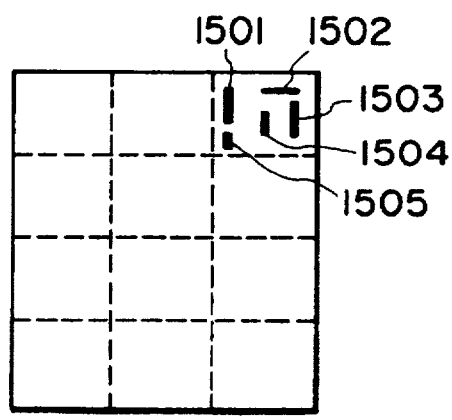
FIG. 31 is a view showing a search display screen according to the eighth embodiment.
Figure 32:
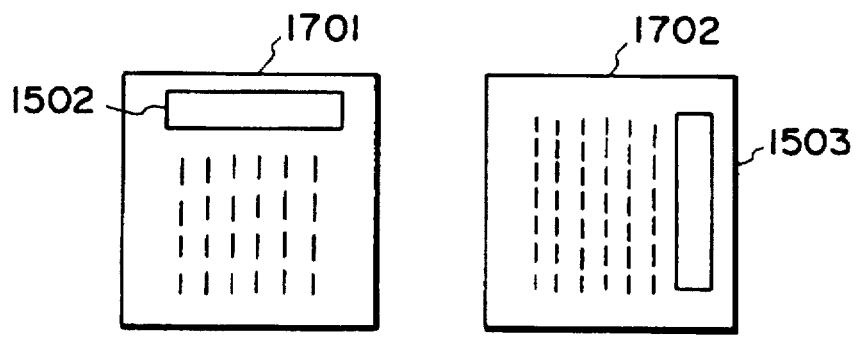
FIG. 32 is a view showing contents of a display screen according to the eighth embodiment.

FIG. 31 shows the layout of the headlines. Since the images are reduced, the headlines of the plurality of pages can be simultaneously displayed on the display screen. Dotted lines are boundaries of the pages. The user checks the headlines displayed on the screen and designates an interesting headline with a mouse or the like. When the headline is selected, the table in the RAM is accessed in response to the selected headline information as address information. The article image of the page stored in the page column is searched from the file, and transferred to the image memory 5106. Only the image data near the selected headline area is displayed on the display, as shown in FIG. 32. A display state 1701 indicates that the selected headline area 1502 horizontally extends. The contents below the headline area 1502 are displayed. A display state 1702 indicates that the selected headline area 1503 vertically extends. In this case, the contents to the left of the headline are displayed. The vertical and horizontal headline areas can be easily and automatically distinguished from each other by comparing the coordinate values of the headline areas.

A means for analyzing the newspaper layout may be arranged to automatically extract and display the article corresponding to the headline.

When a document (e.g., newspaper) having a smaller number of pages but a large size is to be filed as images, the headlines are extracted and their coordinates are stored. Only the headlines are simultaneously displayed on the screen. The user designates an interesting headline with a mouse, and only the article corresponding to the designated headline can be displayed.

Each of the fifth to eighth embodiments exemplifies a means for searching a specific main body portion of one document from the table of contents. The functions of the apparatus of each embodiment can be applied when a large number of documents are filed as images. When a specific document is searched from a large number of documents, a page such as a cover page describing a title of a document is input while it is distinguished from other pages. During input operations, characters are trimmed using the character trimming apparatus, and document name areas are extracted. During document retrieval, the document name images are simultaneously displayed on the screen, and the user selects an interesting document name with a coordinate pointer device on the screen, thereby selecting the specific document.

As described above, after the document is selected, a specific page in the document can be searched using the image of the table of contents, as described in the fifth to eighth embodiments. Without inputting a searching key word or the like by using a keyboard, only the desired content can be searched from a large number of document images by hierarchy of the present invention, thereby providing the desired content to the user.

After the characters are trimmed, the document names and the items of the table of contents may be recognized by a character recognition unit, and the recognized results may be stored as character codes. In this case, when the user knows a document name or the like of interest beforehand, a desired document name or the like can be displayed by entering the document name or the like at a keyboard.

As described above, without converting the characters of the document names and the items of the table of contents into ASCII or JIS standard character codes, the character patterns may be recognized by character recognition and classified by simple image processing. Each character may be stored as a degenerate code (previously described) having a few bits, and degenerate code train matching may be performed to search the desired character pattern.

As described above, items for classifying or summarizing the contents of the document (map) are extracted from the document image. When the user wishes to search a specific portion of the document, he checks items displayed on the display, searches a desired item, and designates it on the screen. Therefore, the corresponding main body portion can be selected and displayed.

What is claimed is:

1. An image processing apparatus comprising:
input means for inputting first image data consisting of a plurality of pages, and second image data of a page including character patterns of indexes and character patterns of page specifying information respectively specifying the plurality of pages, said character patterns of page specifying information corresponding to respective ones of the indexes;

discriminating means for discriminating the character patterns of the indexes and the character patterns of the page specifying information in the image data input by said input means;

recognizing means for recognizing the character patterns of the page specifying information discriminated by said discriminating means to provide recognized page specifying information respectively specifying the plurality of pages;

generating means for generating a table comprising (a) position data of the character patterns of the indexes discriminated by said discriminating means and (b) the recognized page specifying information, wherein the position data of the character pattern of the index for each one of the plurality of pages is provided in the table in correspondence with the recognized page specifying information specifying that one page; and registering means for registering the table generated by said generating means and the first image data in correspondence to each other.

2. An image processing method comprising the steps of:
a first inputting step of inputting first image data consisting of a plurality of pages;

a second inputting step of inputting second image data of a page including character patterns of indexes and character patterns of page specifying information respectively specifying the plurality of pages, said character patterns of page specifying information corresponding to respective ones of the indexes;

discriminating the character patterns of the indexes and the character patterns of the page specifying information in the image data input in said second inputting step;

recognizing the character patterns of the page specifying information discriminated in said discriminating step to provide recognized page specifying information respectively specifying the plurality of pages;

generating a table comprising position data of the character patterns of the indexes discriminated in said discriminating step and the recognized page specifying information, wherein the position data of the character pattern of the index for each one of the plurality of pages is provided in the table in correspondence with the recognized page specifying information specifying that one page; and registering the table and the first image data in correspondence to each other.

3. An image processing apparatus comprising:

memory means for storing (a) first image data consisting of a plurality of pages, (b) second image data of a page including character patterns of indexes corresponding to respective ones of the plurality of pages, and (c) a table comprising position data of the character patterns of the indexes and identification data for identifying respective ones of the plurality of pages corresponding to respective ones of the indexes, wherein the position data of the character pattern of the index for each one of the plurality of pages is provided in the table in correspondence with the identification data identifying that one page, and wherein the table is generated by recognizing the second image data;

display means, for displaying the second image data, wherein a character pattern of the second image data may be designated on said display means;

detecting means for detecting position data of a character pattern designated on said display means;

search means for determining which of the identification data is provided in the table in correspondence to the position data detected by said detecting means, and for searching the first image data to locate the first image data of the page corresponding to the determined identification data; and read means for reading from said memory means the first image data of the page located by said search means.

4. An image processing method comprising the steps of:

storing in a memory first image data consisting of a plurality of pages and second image data of a page including character patterns of indexes corresponding to respective ones of the plurality of pages;

generating and storing a table in the memory by recognizing the second image data, said table comprising position data of the character patterns of the indexes and identification data for identifying respective ones of the plurality of pages corresponding to respective indexes, wherein the position data of the character pattern of the index for each one of the plurality of pages is provided in the table in correspondence with the identification data identifying that one page;

displaying the second image data on a display device on which a character pattern of the second image data may be designated;

detecting position data corresponding to a character pattern designated on the display device;

determining which of the identification data is provided in the table in correspondence to the position data detected in said detecting step;

searching the first image data to locate the first image data of the page corresponding to the determined identification data; and reading from the memory the first image data of the page located in said searching step.

5. A memory medium storing instructions for causing a programmable apparatus loaded with the instructions to perform an image processing method comprising the steps of:

a first inputting step of inputting first image data consisting of a plurality of pages;

a second inputting step of inputting second image data of a page including character patterns of indexes and character patterns of page specifying information respectively specifying the plurality of pages, said character patterns of page specifying information corresponding to respective ones of the indexes;

discriminating the character patterns of the indexes and the character patterns of the page specifying information in the image data input in said second inputting step;

recognizing the character patterns of the page specifying information discriminated in said discriminating step to provide recognized page specifying information respectively specifying the plurality of pages;

generating a table comprising position data of the character patterns of the indexes discriminated in said discriminating step and the recognized page specifying information, wherein the position data of the character pattern of the index for each one of the plurality of pages is provided in the table in correspondence with the recognized page specifying information specifying that one page; and registering the table and the first image data in correspondence to each other.

6. A memory medium storing instructions for causing a programmable apparatus, when loaded with the instructions, to perform an image processing method comprising the steps of:

storing in a memory first image data consisting of a plurality of pages and second image data of a page including character patterns of indexes corresponding to respective ones of the plurality of pages;

generating and storing a table in the memory by recognizing the second image data, said table comprising position data of the character patterns of the indexes and identification data for identifying respective ones of the plurality of pages corresponding to respective indexes, wherein the position data of the character pattern of the index for each one of the plurality of pages is provided in the table in correspondence with the identification data identifying that one page;

displaying the second image data on a display device on which a character pattern of the second image data may be designated;

detecting position data corresponding to a character pattern designated on the display device;

determining which of the identification data is provided in the table in correspondence to the position data detected in said detecting step;

searching the first image data to locate the first image data of the page corresponding to the determined identification data; and reading from the memory the first image data of the page located in said searching step.

7. An apparatus according to claim 1, further comprising a display means for displaying the second image data and character patterns of page specifying information upon input of the first image data.

8. An apparatus according to claim 1, further comprising means for displaying the image data registered by said registering means.

9. An apparatus according to claim 8, further comprising:
designating means for designating a position of a desired item in the image data displayed by said display means; and
means for discriminating a number of the designated item in the displayed image data.

10. An apparatus according to claim 9, further comprising means for detecting a position of page specifying information and for recognizing a page number represented by the page specifying information.

11. A method according to claim 2, further comprising the steps of:
displaying the second image data of the page including character patterns of indexes on a display device whereby certain items of displayed image data may be designated; and
discriminating a number of the designated item in the displayed image data.

12. A method according to claim 11, further comprising a step of detecting a position of page specifying information and recognizing a page number represented by the page specifying information.

13. A method according to claim 12, wherein the table is an item table listing item numbers, item position data, and recognized numerals of page numbers in correspondence with each other from the second image data of the page including character patterns of indexes and character patterns of page specifying information.

14. An apparatus according to claim 3, wherein said display means displays the second image data of the page including the character patterns of indexes upon input of the first image data consisting of the plurality of pages.

15. An apparatus according to claim 3, further comprising means for discriminating a number of the designated data.

16. An apparatus according to claim 15, wherein said detecting means detects position data of a page number in the image data and recognizes a numeral representing the page number.

17. An apparatus according to claim 16, wherein the table is an item table listing item numbers, item position data and recognized numerals of page numbers in correspondence with each other from the second image data of the page including character patterns of indexes.

18. A method according to claim 4, wherein image data of a page including character patterns of indexes is extracted and displayed upon input of the first image data consisting of the plurality of pages.

19. A method according to claim 4, further comprising the step of discriminating a number of the designated data in the displayed image data.

20. A method according to claim 19, wherein said discriminating step includes detecting a position of a page number in the image data and recognizing a numeral representing the page number.

21. A method according to claim 20, wherein the table is an item table listing item numbers, item position data, and recognized numerals of page numbers in correspondence with each other from the second image data of the page including character patterns of indexes, and wherein said detecting step includes detecting the page number which corresponds to a designated position.

22. An apparatus according to claim 1, wherein said input means comprises at least one scanner.

23. An apparatus according to claim 1, wherein said discriminating means discriminates the character patterns of the indexes and the page specifying information from the second input image data by making a histogram of the second image data.

24. An apparatus according to claim 1, wherein said input means inputs the image data in response to an instruction indicating that the image data represents the indexes.

25. A method according to claim 2, wherein said first and second inputting steps are performed using a scanner.

26. A method according to claim 2, wherein said discriminating step includes discriminating the character patterns of the indexes and the page specifying information from the input second image data by making a histogram of the second image data.

27. A method according to claim 2, wherein said second input step includes inputting the image data in response to an instruction indicating that the image data represents the indexes.

28. A method according to claim 2, further comprising the step of displaying the registered image data.

29. An apparatus according to claim 3, further comprising a pointing device for designating a desired position on said display means.

30. An apparatus according to claim 3, wherein said display means also displays the image data read by said read means.

31. A method according to claim 4, further comprising the step of designating a desired position in the display step.

32. A method according to claim 4, wherein said display step includes displaying the image data read in said reading step.

33. A memory medium according to claim 5, wherein said method further comprises the steps of:
displaying the second image data of the page including character patterns of indexes on a display device whereby certain items of displayed image data may be designated; and
discriminating a number of the designated item in the displayed image data.

34. A memory medium according to claim 33, further comprising a step of detecting a position of page specifying information and recognizing a page number represented by the page specifying information.

35. A memory medium according to claim 34, wherein the table is an item table listing item numbers, item position data, and recognized numerals of page numbers in correspondence with each other from the second image data of the page including character patterns of indexes and character patterns of page specifying information.

36. A memory medium according to claim 5, wherein said first and second inputting steps are performed using a scanner.

37. A memory medium according to claim 5, wherein said discriminating step includes discriminating the character patterns of the indexes and the page specifying information from the input second image data by making a histogram of the second image data.

38. A memory medium according to claim 5, wherein said second input step includes inputting the image data in response to an instruction indicating that the image data represents the indexes.

39. A memory medium according to claim 5, further comprising the step of displaying the registered image data.

40. A memory medium according to claim 6, wherein image data of a page including character patterns of indexes is extracted and displayed upon input of the first image data consisting of the plurality of pages.

41. A memory medium according to claim 6, wherein said method further comprises the step of discriminating a number of the designated data in the displayed image data.

42. A memory medium according to claim 41, wherein said discriminating step includes detecting a position of a page number in the image data and recognizing a numeral representing the page number.

43. A memory medium according to claim 42, wherein the table is an item table listing item numbers, item position data, and recognized numerals of page numbers in correspondence with each other from the second image data of the page including character patterns of indexes, and wherein said detecting step includes detecting the page number which corresponds to a designated position.

44. A memory medium according to claim 6, wherein the method further comprises the step of designating a desired position in the display step.

45. A memory medium according to claim 6, wherein said display step includes displaying the image data read in said reading step.

46. An apparatus according to claim 10, wherein said generating means generates an item table listing item numbers, item position data, and recognized numerals of page numbers in correspondence with each other from the second image data of the page including character patterns of indexes and character patterns of page specifying information, and wherein said detecting means detects the page specifying information which corresponds to a position designated on said display means.

* * * * *